United States Patent
Mizukami et al.

(10) Patent No.: US 9,255,490 B2
(45) Date of Patent: Feb. 9, 2016

(54) GAS TURBINE AND OPERATING METHOD THEREOF

(75) Inventors: Satoshi Mizukami, Hyogo (JP); Tatsuo Ishiguro, Hyogo (JP); Junichiro Masada, Hyogo (JP); Kazumasa Takata, Hyogo (JP); Yuya Fukunaga, Hyogo (JP); Hiroki Takahashi, Miyagi (JP); Masaki Satoh, Miyagi (JP); Yoshiaki Nishimura, Miyagi (JP); Norio Oogai, Niigata (JP); Souji Hasegawa, Miyagi (JP); Masato Hayashi, Miyagi (JP)

(73) Assignees: MITSUBISHI HEAVY INDUSTRIES, LTD., Tokyo (JP); TOHOKU ELECTRIC POWER COMPANY, INC., Sendai-shi (JP)

( * ) Notice: Subject to any disclaimer, the term of this patent is extended or adjusted under 35 U.S.C. 154(b) by 1037 days.

(21) Appl. No.: 13/056,064
(22) PCT Filed: Sep. 24, 2009
(86) PCT No.: PCT/JP2009/066485
§ 371 (c)(1),
(2), (4) Date: Jan. 26, 2011
(87) PCT Pub. No.: WO2010/041552
PCT Pub. Date: Apr. 15, 2010

(65) Prior Publication Data
US 2011/0138818 A1   Jun. 16, 2011

(30) Foreign Application Priority Data

Oct. 8, 2008   (JP) ................................. 2008-262072
Oct. 8, 2008   (JP) ................................. 2008-262074
Oct. 8, 2008   (JP) ................................. 2008-262075

(51) Int. Cl.
*F01D 11/24*   (2006.01)
*F02C 7/18*   (2006.01)
(Continued)

(52) U.S. Cl.
CPC ................ *F01D 11/24* (2013.01); *F01D 21/00* (2013.01); *F02C 7/18* (2013.01); *F02C 7/12* (2013.01); *F05D 2260/205* (2013.01); *F05D 2260/608* (2013.01)

(58) Field of Classification Search
CPC .............. F02C 7/185; F02C 7/18; F02C 7/12; F02C 6/08; F02C 9/18; F05D 2260/205; F01D 11/24

USPC ........ 60/782, 783, 785, 795, 806, 39.83, 778, 60/786
See application file for complete search history.

(56) References Cited

U.S. PATENT DOCUMENTS
2,940,257 A   6/1960   Eckert et al.
5,167,487 A   12/1992   Rock
(Continued)

FOREIGN PATENT DOCUMENTS
CN   1221069 A   6/1999
CN   101230790 A   7/2008
(Continued)

OTHER PUBLICATIONS
A Decision to Grant a Patent dated Dec. 2, 2013, issued in Korean Patent Application No. 10-2013-7004035, with Concise English-language explanation of relevance. (5 pages).
(Continued)

*Primary Examiner* — Steven Sutherland
(74) *Attorney, Agent, or Firm* — Westerman, Hattori, Daniels & Adrian, LLP

(57) ABSTRACT

Provided is a gas turbine capable of achieving high-speed startup of the gas turbine through quick operation control of an ACC system during startup of the gas turbine, improving the cooling efficiency of turbine stationary components, and quickly carrying out an operation required for cat back prevention during shutdown of the gas turbine. Included are a pressurizing device (40) connected to a branching channel (42) branching from the discharge side of a compressor (11) and capable of carrying out an operation for introducing and pressurizing air independently from the compressor (11); a temperature-control-medium supply channel (43) that guides compressed air pressurized at the pressuring device (40) to a turbine-cooling-medium channel (50) provided in stationary components of a turbine (13); and a temperature-control-medium return channel (44) that guides the compressed air that has passed through the turbine-cooling-medium channel (50) to the discharge side of the compressor (11) such that the flows are combined, and the pressurizing device (40) is operated at startup of the gas turbine and in preparation immediately before startup to carry out temperature-raising and cooling by letting the compressed air flow in the turbine-cooling-medium channel (50). The pressurizing device (40) is operated during shutdown of the gas turbine to exhaust the high-temperature gas remaining in the turbine (13).

2 Claims, 20 Drawing Sheets

(51) Int. Cl.
*F01D 21/00* (2006.01)
*F02C 7/12* (2006.01)

(56) References Cited

U.S. PATENT DOCUMENTS

| | | | |
|---|---|---|---|
| 5,205,115 | A | 4/1993 | Plemmons et al. |
| 5,782,076 | A * | 7/1998 | Huber et al. .................... 60/782 |
| 6,035,929 | A | 3/2000 | Friedel et al. |
| 6,253,554 | B1 | 7/2001 | Kobayashi et al. |
| 6,487,863 | B1 * | 12/2002 | Chen et al. ....................... 60/782 |
| 6,532,744 | B1 * | 3/2003 | Reiter et al. .................... 60/782 |
| 6,625,989 | B2 * | 9/2003 | Boeck .............................. 60/782 |
| 6,644,035 | B1 | 11/2003 | Yamanaka et al. |
| 6,769,259 | B2 * | 8/2004 | Yamanaka et al. ............. 60/778 |
| 6,857,270 | B2 * | 2/2005 | Kobayashi et al. ............. 60/736 |
| 6,986,256 | B2 * | 1/2006 | Yamanaka et al. ............. 60/778 |
| 2001/0022087 | A1 | 9/2001 | Kobayashi et al. |
| 2002/0092301 | A1 | 7/2002 | Kobayashi et al. |
| 2003/0056513 | A1 | 3/2003 | Kobayashi et al. |
| 2004/0045294 | A1 | 3/2004 | Kobayashi et al. |
| 2004/0206092 | A1 | 10/2004 | Kobayashi et al. |
| 2004/0228723 | A1 | 11/2004 | Dittmann et al. |
| 2005/0097898 | A1 | 5/2005 | Yamanaka et al. |
| 2006/0225425 | A1 | 10/2006 | Kobayashi et al. |
| 2006/0225430 | A1 * | 10/2006 | Paprotna et al. ................ 60/782 |

FOREIGN PATENT DOCUMENTS

| | | |
|---|---|---|
| DE | 2 259 580 A1 | 6/1974 |
| EP | 1 128 039 A2 | 8/2001 |
| EP | 1314872 A1 | 5/2003 |
| JP | 57-26211 A | 2/1982 |
| JP | 58-214603 A | 12/1983 |
| JP | 62-142808 A | 6/1987 |
| JP | 62-182444 A | 8/1987 |
| JP | 4-37807 U | 3/1992 |
| JP | 6-317184 A | 11/1994 |
| JP | 7-189740 A | 7/1995 |
| JP | 8-284687 A | 10/1996 |
| JP | 9-060531 A | 3/1997 |
| JP | 11-036889 A | 2/1999 |
| JP | 11-093694 A | 4/1999 |
| JP | 11-125199 A | 5/1999 |
| JP | 11-159345 A | 6/1999 |
| JP | 11-200893 A | 7/1999 |
| JP | 2941748 B2 | 8/1999 |
| JP | 2000-179355 A | 6/2000 |
| JP | 2000-220407 A | 8/2000 |
| JP | 2000-511261 A | 8/2000 |
| JP | 3329754 B2 | 9/2000 |
| JP | 2001-123851 A | 5/2001 |
| JP | 3197190 B2 | 8/2001 |
| JP | 2001-248406 A | 9/2001 |
| JP | 2001-271655 A | 10/2001 |
| JP | 3238299 B2 | 12/2001 |
| JP | 2002-371806 A | 12/2002 |
| JP | 2003-206757 A | 7/2003 |
| JP | 2004-44583 A | 2/2004 |
| JP | 2004-116485 A | 4/2004 |
| JP | 2004-169584 A | 6/2004 |
| JP | 2005-171455 A | 6/2005 |
| JP | 2006-2766 A | 1/2006 |
| JP | 2006-112282 A | 4/2006 |
| JP | 3887469 B2 | 2/2007 |
| JP | 2008-38807 A | 2/2008 |
| JP | 2008-82247 A | 4/2008 |
| WO | 2008/038497 A1 | 4/2008 |

OTHER PUBLICATIONS

A Decision to Grant a Patent dated Dec. 2, 2013, issued in Korean Patent Application No. 10-2013-7004036, with Concise English-language explanation of relevance. (5 pages).
Japanese Office Action dated Aug. 27, 2013, in corresponding to Japanese Application No. 2008-262074, w/English Translation. (6 pages).
European Search Report dated Jul. 25, 2013 in corresponding European Application No. 13165248.9. (6 pages).
Korean Notice of Allowance dated Sep. 24, 2013, issued in corresponding Korean Patent Application No. 10-2011-7002103, w/ concise explanation of relevance.
International Search Report of PCT/JP2009/066485, mailing date Dec. 22, 2009.
Decision to Grant a Patent dated Feb. 25, 2014, issued in Japanese Patent Application No. 2008-262074 (3 pages) with Partial English Tranalation.
European Office Action dated Sep. 3, 2014, issued in related European Patent Application No. 13165248.9 (5 pages).
Extended European Search Report dated Sep. 10, 2014, issued in corresponding European Patent Application No. 09819087.9 (9 pages).
Extended European Search Report dated Nov. 20, 2014, issued in corresponding European Patent Application No. 13165249.7 (9 pages).
Japanese Office Action dated Sep. 30, 2014, issued in Japanese Patent Application No. 2013-245017, w/ English translation (10 pages).
Extended European Search Report dated Jan. 20, 2015, issued in related European Patent Application No. 13194464.7 (6 pages).
Office Action dated Feb. 4, 2015, issued in corresponding Chinese application No. 201310355200.4, with English translation. (19 pages).
Decision to Grant a Patent dated Apr. 24, 2015, issued in counterpart Chinese Patent Application No. 200980130681.0 (2 pages). Explanation of Relevance—"The Decision to Grant a Patent has been received."
Office Action dated Jun. 23, 2015, issued in corresponding Japanese application No. 2013-245017, with English translation. (14 pages).

* cited by examiner

GAS TURBINE AND OPERATING METHOD THEREOF

TECHNICAL FIELD

The present invention relates to a gas turbine and an operation method thereof and, more specifically, relates to an active clearance control (ACC) system at startup of the gas turbine and to cat-back prevention while the gas turbine is shut down.

BACKGROUND ART

A typical gas turbine is constituted of a compressor, a combustor, and a turbine, and air taken in from an air intake port is compressed by the compressor into high-temperature, high-pressure compressed air. The compressed air is supplied to the combustor, and, in the combustor, high-temperature, high-pressure combustion gas is generated by supplying fuel to the compressed air and combusting it. Since the combustion gas drives the turbine connected to the compressor, for example, power can be generated at the generator driven by the gas turbine by connecting the generator to the output shaft of the gas turbine.

With such a gas turbine, an active clearance control (hereinafter referred to as ACC) system carries out control to minimize the tip clearance, which fluctuates in response to the effect of temperature and centrifugal force, which vary in accordance with the operating state, preventing interference between rotary parts and stationary parts and achieving high efficiency in operation.

In general, in a gas turbine in which tip clearance is not controlled, tip clearance is minimized at a startup position, not at a position during rated operation. Thus, with the ACC system, an operating state with minimum tip clearance is set during rated operation by warming up stationary components that affect the tip clearance in a step before starting up the gas turbine. In other words, as illustrated in FIGS. 12A to 12D, the ACC system is a technique for minimizing clearance during rated operation to ensure the operating efficiency by increasing the clearance in advance by warming up the turbine stationary parts before starting up the gas turbine and adjusting the temperature of the turbine stationary parts during rated operation.

The operation of a gas turbine with the above-described ACC system can be broadly classified into the following five states.
(1) Immediately Before Startup To apply the ACC system, the stationary components of the turbine stator blades are warmed up by letting a temperature-control medium (heating medium) flow therethrough, thus increasing the expansion to increase the clearance between stationary parts, such as a blade ring, and rotor blades, which are rotary parts.
(2) During Startup (while Increasing Load)

In the same manner as immediately before startup, the stationary components continue to be warmed up so that the clearance does not disappear during startup (so that the stationary parts and the rotary parts do not contact each other).
(3) During Rated Operation The clearance between the stationary parts and the rotary parts is minimized by changing the conditions (temperature etc.,) of the temperature-control medium (heating medium) flowing through the stationary components.
(4) During Shut-Down (while Lowering Load)

In the same manner as immediately before startup, the stationary components continue to be warmed up so that the clearance does not disappear during shutdown (so that the stationary parts and the rotary parts do not contact each other).
(5) During Shut-Down High-temperature gas remaining inside the gas turbine is exhausted outside the gas turbine to prevent cat back. Furthermore, the distribution of gas remaining inside the gas turbine is eliminated by letting the temperature-control medium (heating medium) flow through the stationary components to prevent cat back.

In the above-described ACC system, the clearance control method for the gas turbine is classified into the following three methods.
(1) Control Method Based on Changing the Conditions of the Cooling Medium Flowing Inside the Turbine Blades This is a control method in which the temperature of the cooling medium flowing inside the turbine is changed by changing the cooling method for the cooling medium etc. (for example, changing from no cooling to air cooling or steam cooling), thereby adjusting the clearance by changing the amount of expansion of the turbine blades themselves, which requires a mechanism for changing the cooling method for the cooling medium.
(2) Control Method Based on Adjusting the Temperature of Stationary Components by Steam or Air This is a method for controlling the clearance by letting steam etc. generated at an exhaust gas boiler flow through the stationary components after adjusting it with valves, etc.; in general, when air is used, the cycle efficiency decreases because the air is discarded to the gas path side without collecting it.

Furthermore, when steam is used, the startup time is long because operation in a simple cycle cannot be achieved, and boiler warm-up is required. Moreover, when steam is used, additional equipment is required, such as an auxiliary boiler for startup and steam piping from the exhaust gas boiler.
(3) Control Method Based on Moving Blades or Casing with a Mechanical Mechanism This is a control method for adjusting the clearance by providing a mechanical mechanism, such as an actuator, and moving the blades and casing.

As related art of the above-described ACC system, compressed air is extracted and, after passing through a flow regulating valve, cools a segmented ring of the stationary components (for example, refer to PTL 1).

Furthermore, part of the steam used in the steam turbine is taken out and returned to the steam turbine system after adjustment by a valve and cooling the segmented ring (for example, refer to PTL 2).

In this way, the cat back problem has been noted when the gas turbine is stopped by the ACC system. Cat back is a phenomenon in which, while the gas turbine is stopped, the gas turbine warps due to a temperature difference. That is, since temperature layers are formed inside the gas turbine even after it has stopped because the inside of the gas turbine reaches a high temperature during operation, a temperature difference is generated between the upper part of the gas turbine (high temperature) and the lower part of the gas turbine (low temperature). As a result, the entire gas turbine warps in a stooping manner due to a difference in the amount of expansion generated between the upper part and lower part of the gas turbine.

As related art to prevent such cat back, a nozzle is provided on the upper part of a cylinder casing, and cooling air flows toward the upper part of the wall surfaces in the cylinder to decreases the upper and lower temperature difference (for example, refer to PTL 3).

Furthermore, there is one in which openings are formed in the cylinder lower part and the cylinder upper part to circulate air in the cylinder using a pump (for example, refer to PTL 4).

CITATION LIST

Patent Literature

{PTL 1} Japanese Unexamined Patent Application, Publication No. HEI-6-317184
{PTL 2} Japanese Unexamined Patent Application, Publication No. 2001-248406
{PTL 3} Japanese Unexamined Patent Application, Publication No. 2005-171455
{PTL 4} Japanese Unexamined Patent Application, Publication No. 2002-371806

SUMMARY OF INVENTION

Technical Problem

However, with the above-described gas turbine, from the viewpoint of improving the operation efficiency of equipment etc., there is a demand for an increase in the startup speed of the gas turbine. Therefore, also with the ACC system during startup of the gas turbine, there is a desire for achieving an increase in the startup speed of the gas turbine by quickly warming up stationary components to a desired temperature and to expand them, thus increasing the clearance between stationary parts and rotary parts to an optimal value. In such a case, it is desirable that the addition of additional equipment can be minimized.

Furthermore, with the above-described gas turbine, there is a demand for improving the cooling efficiency of the stationary components of the turbine during rated operation. In such a case, it is desirable that the addition of additional equipment be minimized.

Moreover, for example, a gas turbine that drives a generator is operated in DSS (daily start-and-stop) mode in order to cope with the power demand fluctuation during day time and night time. That is, in such DSS mode, since operation and shutdown of the gas turbine are frequently carried out, there is a desire for quickly completing the operation required for cat back prevention. Furthermore, for a gas turbine operated in DSS mode, it is also desirable that the time required for startup be short. Moreover, it is also desirable to minimize additional equipment required for cat back prevention.

The present invention has been conceived in light of the above-described circumstances, and an object thereof is to provide a gas turbine and a startup operating method thereof in which quick operation control of the ACC system is carried out during startup of the gas turbine, and an increase in the startup speed of the gas turbine is achieved.

Another object of the present invention is to provide a gas turbine and rated-operation operating method thereof that achieve improved cooling efficiency of the stationary components of the turbine in the ACC system during rated operation of the gas turbine.

Another object of the present invention is to provide a gas turbine and shutdown operating method thereof that are capable of quickly carrying out the operation required for cat back prevention during shutdown of the gas turbine.

Solution to Problem

To solve the above-described problems, the present invention employs the following solutions.

A gas turbine according to a first aspect of the present invention is a gas turbine that supplies combustion gas generated by supplying fuel to a combustor where the fuel is combusted with compressed air compressed at a compressor to a turbine to acquire rotational power, the gas turbine including pressurizing means connected to a branching channel branching from a discharge-side channel of the compressor and capable of carrying out an operation for introducing and pressurizing a heating medium independently from the compressor; a heating-medium supply channel that guides pressurized heating medium pressurized at the pressuring means to a turbine-cooling-medium channel provided in a stationary component of the turbine; and a heating-medium return channel that guides the pressurized heating medium that has passed through the turbine-cooling-medium channel to the discharge-side channel such that the flows are combined, wherein the pressurizing means is operated at startup of the gas turbine and in preparation immediately before startup to raise the temperature by letting the pressurized heating medium flow in the turbine-cooling-medium channel.

Such a gas turbine apparatus includes pressurizing means connected to a branching channel branching from a discharge-side channel of the compressor and capable of carrying out an operation for introducing and pressurizing a heating medium independently from the compressor; a heating-medium supply channel that guides pressurized heating medium pressurized at the pressuring means to a turbine-cooling-medium channel provided in a stationary component of the turbine; and a heating-medium return channel that guides the pressurized heating medium that has passed through the turbine-cooling-medium channel to the discharge-side channel such that the flows are combined, wherein the pressurizing means is operated at startup of the gas turbine and in preparation immediately before startup to raise the temperature by letting the pressurized heating medium flow in the turbine-cooling-medium channel; therefore, the pressurized heating medium having a raised temperature by being pressurized at the pressurizing means heats and warms up the stationary components of the turbine while passing through the turbine-cooling-medium channel. At this time, since the pressurizing means can be operated independently from the gas turbine main body, rapid clearance control is possible in preparation immediately before startup of the gas turbine.

In the above-described aspect, it is desirable that a bypass channel that branches from a midpoint in the heating-medium supply channel and is connected to the discharge-side channel, and including channel opening/closing means, be further included; in this way, part of the pressurized heating medium having a raised temperature is re-pressurized and re-heated by letting part of the pressurized heating medium pressurized at the pressurizing means to raise the temperature thereof flow through the bypass channel by opening the channel opening/closing means. Therefore, the temperature of the pressurized heating medium, after pressurization, passing through the turbine-cooling-medium channel is increased even more.

In the above-described aspect, it is desirable that heating means that carries out heat exchange with the heating medium or the pressurized heating medium to raise the temperature be provided in the branching channel or the heating-medium supply channel; in this way, the temperature of the pressurized heating medium can be increased even more by heating the pressurized heating medium passing through the turbine-cooling-medium channel.

In the above-described aspect, it is desirable to provide a heating-medium branching supply channel that branches from the heating-medium supply channel and that is connected to a compressor-cooling-medium channel in the compressor and a heating-medium branching return channel that guides the pressurized heating medium, which has passed through the compressor-cooling-medium channel, to the discharge-side channel such that the flows are combined; in this way, since, in addition to the temperature of the stationary components of the gas turbine, the temperature of the compressor side can also be raised, clearance control of the turbine and the compressor becomes possible.

In the above-described aspect, it is desirable that selective-switching means for the heating medium be provided on an intake side of the pressurizing means; in this way, pressure and temperature can be raised by introducing a high-temperature heating medium from outside the gas turbine, when necessary.

In the above-described aspect, it is desirable that the pressurized heating medium pressurized at the pressurizing means be guided to the discharge-side channel such that the flows are combined after being connected in series or parallel with the turbine-cooling-medium channel for carrying out cooling in the combustor; in this way, in addition to clearance control of the gas turbine, cooling of the combustor can be carried out.

A startup operating method for a gas turbine according to a second aspect of the present invention is a startup operating method of a gas turbine that supplies combustion gas generated by supplying fuel to a combustor where the fuel is combusted with compressed air compressed at a compressor to a turbine to acquire rotational power, the method, which is carried out at startup of the gas turbine and in preparation immediately before startup, including a step in which pressurizing means, which is connected to a branching channel branching from a discharge-side channel of the compressor and capable of operating independently from the compressor, introduces and pressurizes a heating medium; a step in which pressurized heating medium pressurized at the pressurizing means is supplied to a turbine-cooling-medium channel provided in a stationary component of the turbine to raise the temperature of the stationary component with the pressurized heating medium passing through the turbine-cooling-medium channel; and a step in which the pressurized heating medium is guided from the turbine-cooling-medium channel to the discharge-side channel such that the flows are combined.

Such an operating method for startup of a gas turbine, which is carried out at startup of the gas turbine and in preparation immediately before startup, includes a step in which pressurizing means, which is connected to a branching channel branching from a discharge-side channel of the compressor and capable of operating independently from the compressor, introduces and pressurizes a heating medium; a step in which pressurized heating medium pressurized at the pressurizing means is supplied to a turbine-cooling-medium channel provided in a stationary component of the turbine to raise the temperature of the stationary component with the pressurized heating medium passing through the turbine-cooling-medium channel; and a step in which the pressurized heating medium is guided from the turbine-cooling-medium channel to the discharge-side channel such that the flows are combined; therefore, the pressurized heating medium pressurized by the pressurizing means to raise the temperature can heat and warm up the stationary components while passing through the turbine-cooling-medium channel. At this time, since the pressurizing means can be operated independently from the gas turbine main body, clearance control can be quickly carried out in preparation immediately before startup of the gas turbine.

A gas turbine according to a third aspect of the present invention is a gas turbine that supplies combustion gas generated by supplying fuel to a combustor where the fuel is combusted with compressed air compressed at a compressor to a turbine to acquire rotational power, the gas turbine including pressurizing means connected to a branching channel branching from a discharge-side channel of the compressor and capable of carrying out an operation for introducing and pressurizing a temperature-control medium independently from the compressor; a temperature-control-medium supply channel that guides pressurized temperature-control medium pressurized at the pressuring means to a turbine-cooling-medium channel provided in a stationary component of the turbine; and a temperature-control medium return channel that guides the pressurized temperature-control medium that has passed through the turbine-cooling-medium channel to the discharge-side channel such that the flows are combined, wherein the pressurizing means is operated during rated operation of the gas turbine to carry out cooling by letting the pressurized temperature-control medium flow in the turbine-cooling-medium channel.

Such a gas turbine includes pressurizing means connected to a branching channel branching from a discharge-side channel of the compressor and capable of carrying out an operation for introducing and pressurizing a temperature-control medium independently from the compressor; a temperature-control-medium supply channel that guides pressurized temperature-control medium pressurized at the pressuring means to a turbine-cooling-medium channel provided in a stationary component of the turbine; and a temperature-control medium return channel that guides the pressurized temperature-control medium that has passed through the turbine-cooling-medium channel to the discharge-side channel such that the flows are combined, wherein the pressurizing means is operated during rated operation of the gas turbine to carry out cooling by letting the pressurized temperature-control medium flow in the turbine-cooling-medium channel; therefore, efficient cooling can be carried out due to the temperature difference between the stationary component of the turbine and the pressurized cooling medium.

In the above-described aspect, it is desirable that the pressurized temperature-control medium pressurized at the pressurizing means be guided to the discharge-side channel such that the flows are combined after being connected in series or parallel with the turbine-cooling-medium channel for carrying out cooling in the combustor; in this way, in addition to clearance control of the gas turbine, cooling of the combustor can be carried out.

In the above-described aspect, it is desirable that temperature controlling means that allows temperature control of the pressurized temperature-control medium be further included; in this way, the relative temperature difference can be increased even more to improve the cooling efficiency even more.

In such a case, it is desirable that the temperature controlling means be a coolant supply channel that adds a coolant to the temperature-control-medium supply channel; in this way, the temperature of the pressurized temperature-control medium pressurized by the pressurizing means to raise the temperature can be lowered by adding a coolant. In this case, the coolant may be liquid or gas.

Furthermore, it is desirable that the temperature controlling means be a heat exchanger that is provided in the branching channel or the temperature-control-medium supply channel and lowers the temperature of the temperature-control medium or the pressurized temperature-control medium; in this way, the temperature of the temperature-control medium before pressurization by the pressurizing means or the temperature of the pressurized temperature-control medium after pressurization can be lowered by the heat exchanger.

In such a case, it is desirable to provide a heating-medium branching supply channel that branches from the heating-medium supply channel and that is connected to a compressor-cooling-medium channel in the compressor and a heating-medium branching return channel that guides the pressurized heating medium, which has passed through the compressor-cooling-medium channel, to the discharge-side channel such that the flows are combined; in this way, since, in addition to the temperature of the stationary components of the gas turbine, the temperature of the compressor side can also be raised, clearance control of the turbine and the compressor becomes possible.

A rated-operation operating method for a gas turbine according to a fourth aspect of the present invention is a rated operation method for a gas turbine that supplies combustion gas generated by supplying fuel to a combustor where the fuel is combusted with compressed air compressed at a compressor to a turbine to acquire rotational power, the method, which is carried out during rated operation of the gas turbine, including a step in which pressurizing means, which is connected to a branching channel branching from a discharge-side channel of the compressor and capable of operating independently from the compressor, introduces and pressurizes a temperature-control medium; a step in which pressurized temperature-control medium pressurized at the pressurizing means is supplied to a turbine-cooling-medium channel provided in a stationary component of the turbine and cools the stationary component with the pressurized temperature-control medium passing through the turbine-cooling-medium channel; and a step in which the pressurized temperature-control medium is guided from the turbine-cooling-medium channel to the discharge-side channel such that the flows are combined.

Such a rated-operation operating method for a gas turbine, the method, which is carried out during rated operation of the gas turbine, includes a step in which pressurizing means, which is connected to a branching channel branching from a discharge-side channel of the compressor and capable of operating independently from the compressor, introduces and pressurizes a temperature-control medium; a step in which pressurized temperature-control medium pressurized at the pressurizing means is supplied to a turbine-cooling-medium channel provided in a stationary component of the turbine and cools the stationary component with the pressurized temperature-control medium passing through the turbine-cooling-medium channel; and a step in which the pressurized temperature-control medium is guided from the turbine-cooling-medium channel to the discharge-side channel such that the flows are combined; therefore, efficient cooling can be carried out by the temperature difference between the stationary component of the turbine and the pressurized temperature-control medium.

A gas turbine according to a fifth aspect of the present invention is a gas turbine that supplies combustion gas generated by supplying fuel to a combustor where the fuel is combusted with compressed air compressed at a compressor to a turbine to acquire rotational power, the gas turbine including pressurizing means connected to a branching channel branching from a discharge-side channel of the compressor and capable of carrying out an operation for introducing and pressurizing a temperature-control medium independently from the compressor; a temperature-control-medium supply channel that guides pressurized temperature-control medium pressurized at the pressuring means to a turbine-cooling-medium channel provided in a stationary component of the turbine; and a temperature-control-medium return channel that guides the pressurized temperature-control medium that has passed through the turbine-cooling-medium channel to the discharge-side channel such that the flows are combined, wherein a ventilation cooling system in which the pressurizing means is operated at shutdown of the gas turbine to exhaust high-temperature gas remaining in the turbine is provided.

Such a gas turbine includes pressurizing means connected to a branching channel branching from a discharge-side channel of the compressor and capable of carrying out an operation for introducing and pressurizing a temperature-control medium independently from the compressor; a temperature-control-medium supply channel that guides pressurized temperature-control medium pressurized at the pressuring means to a turbine-cooling-medium channel provided in a stationary component of the turbine; and a temperature-control-medium return channel that guides the pressurized temperature-control medium that has passed through the turbine-cooling-medium channel to the discharge-side channel such that the flows are combined, wherein a ventilation cooling system in which the pressurizing means is operated at shutdown of the gas turbine to exhaust high-temperature gas remaining in the turbine is provided; therefore, during shutdown of the gas turbine, the high-temperature gas remaining in the turbine is forcefully discharged to the atmosphere to quickly carry out ventilation cooling.

In the above-described aspect, it is desirable that the ventilation cooling system include an exhaust channel branching from the temperature-control-medium supply channel and having channel opening/closing means and channel opening/closing means provided in the temperature-control-medium supply channel, downstream of the branching point of the exhaust channel.

Furthermore, in the present invention described above, it is desirable that the ventilation cooling system include an exhaust channel branching from the branching channel and having channel opening/closing means.

A gas turbine according to a sixth aspect of the present invention is a gas turbine that supplies combustion gas generated by supplying fuel to a combustor where the fuel is combusted with compressed air compressed at a compressor to a turbine to acquire rotational power, the gas turbine including pressurizing means connected to a branching channel branching from a discharge-side channel of the compressor and capable of carrying out an operation for introducing and pressurizing a temperature-control medium independently from the compressor; a temperature-control-medium supply channel that guides pressurized temperature-control medium pressurized at the pressuring means to a turbine-cooling-medium channel provided in a stationary component of the turbine; and a temperature-control-medium return channel that guide the pressurized temperature-control medium that has passed through the turbine-cooling-medium channel to the discharge-side channel such that the flows are combined, wherein the pressurizing means is operated at shutdown of the gas turbine to let the pressurized temperature-control medium flow in the turbine-cooling-medium channel.

Such a gas turbine includes pressurizing means connected to a branching channel branching from a discharge-side channel of the compressor and capable of carrying out an operation for introducing and pressurizing a temperature-control medium independently from the compressor; a temperaturecontrol-medium supply channel that guides pressurized temperature-control medium pressurized at the pressuring means to a turbine-cooling-medium channel provided in a stationary component of the turbine; and a temperature-control-medium return channel that guide the pressurized temperature-control medium that has passed through the turbine-cooling-medium channel to the discharge-side channel such that the flows are combined, wherein the pressurizing means is operated at shutdown of the gas turbine to let the pressurized temperature-control medium flow in the turbine-cooling-medium channel; therefore, during shutdown of the gas turbine, the pressurized temperature-control medium flows through the turbine-cooling-medium channel in a circulating manner, and the temperature distribution of the inside of the gas turbine can be made substantially uniform.

A shutdown operating method for a gas turbine according to a seventh aspect of the present invention is a shutdown operating method for a gas turbine that supplies combustion gas generated by supplying fuel to a combustor where the fuel is combusted with compressed air compressed at a compressor to a turbine to acquire rotational power, the method, which is carried out at shutdown of the gas turbine, including a step in which pressurizing means connected to a branching channel branching from a discharge-side channel of the compressor and capable of carrying out an operation for introducing and pressurizing a temperature-control medium independently from the compressor; a step in which pressurized temperature-control medium pressurized at the pressurizing means returns to the discharge-side channel via a temperature-control-medium supply channel, a turbine-cooling-medium channel, and a temperature-control-medium return channel; and a step in which exhausting to the atmosphere is carried out from the discharge-side channel through the combustor and the turbine.

Such an operating method for shutdown of a gas turbine includes a step in which pressurizing means connected to a branching channel branching from a discharge-side channel of the compressor and capable of carrying out an operation for introducing and pressurizing a temperature-control medium independently from the compressor; a step in which pressurized temperature-control medium pressurized at the pressurizing means returns to the discharge-side channel via a temperature-control-medium supply channel, a turbine-cooling-medium channel, and a temperature-control-medium return channel; and a step in which exhausting to the atmosphere is carried out from the discharge-side channel through the combustor and the turbine; therefore, during shutdown of the gas turbine, the high-temperature gas remaining in the turbine is forcefully discharged to the atmosphere to quickly carry out ventilation cooling.

An operating method for shutdown of a gas turbine according to an eighth aspect of the present invention is a shutdown operating method for a gas turbine that supplies combustion gas generated by supplying fuel to a combustor where the fuel is combusted with compressed air compressed at a compressor to a turbine to acquire rotational power, the method, which is carried out at shutdown of the gas turbine, including a step in which pressurizing means connected to a branching channel branching from a discharge-side channel of the compressor and capable of carrying out an operation for introducing and pressurizing a temperature-control medium independently from the compressor; a step in which pressurized temperature-control medium pressurized at the pressurizing means returns to the discharge-side channel via a temperature-control-medium supply channel, a turbine-cooling-medium channel, and a temperature-control-medium return channel; and a step in which intake is carried out from the discharge-side channel through the branching channel to the pressurizing means.

Such an operating method for shutdown of a gas turbine includes a step in which pressurizing means connected to a branching channel branching from a discharge-side channel of the compressor and capable of carrying out an operation for introducing and pressurizing a temperature-control medium independently from the compressor; a step in which pressurized temperature-control medium pressurized at the pressurizing means returns to the discharge-side channel via a temperature-control-medium supply channel, a turbine-cooling-medium channel, and a temperature-control-medium return channel; and a step in which intake is carried out from the discharge-side channel through the branching channel to the pressurizing means; therefore, during shutdown of the gas turbine, the pressurized temperature-control medium flows through the turbine-cooling-medium channel in a circulating manner, and the temperature distribution of the inside of the gas turbine can be made substantially uniform.

An operating method for shutdown of a gas turbine according to a ninth aspect of the present invention is a shutdown operating method for a gas turbine that supplies combustion gas generated by supplying fuel to a combustor where the fuel is combusted with compressed air compressed at a compressor to a turbine to acquire rotational power, wherein, at shutdown of the gas turbine, the shutdown operating method according to Claim 19 is selected when the shutdown period of the gas turbine is long, whereas the shutdown operating method according to Claim 20 is selected when the shutdown period of the gas turbine is short.

With such a shutdown operating method for a gas turbine, at shutdown of the gas turbine, the shutdown operating method for a gas turbine according to Claim 19 is selected when the shutdown period of the gas turbine is long, whereas the shutdown operating method for a gas turbine according to Claim 20 is selected when the shutdown period of the gas turbine is short; therefore, by selecting the operating method for shutdown of a gas turbine according to Claim 20 when the shutdown period of the gas turbine is short, for example, as in a DSS mode, the inside of the turbine can be maintained substantially evenly at a relatively high temperature, and the warm-up operation time during startup can be shortened.

Advantageous Effects of Invention

According to the present invention described above, quick operation control of the ACC system is carried out at startup of the gas turbine and in preparation immediately before startup, and the startup speed of the gas turbine can be increased. In other words, at startup of the gas turbine and in preparation immediately before startup, since ACC control for expanding the stationary components by quickly warming them up to a desired temperature and increasing the clearance between the stationary parts and the rotary parts to an optimal value is possible, startup speed of the gas turbine can be increased by decreasing the time required for startup preparation of the gas turbine, and the equipment operating efficiency of the gas turbine is improved.

In this case, the effective use of the pressuring means and so on by sharing them as pressurizing means for boost-up used for closed cooling realizes high-speed startup of the gas turbine by performing ACC control with minimum additional equipment, i.e., without adding new equipment.

According to the present invention, in the ACC system operated during rated operation of the gas turbine, the cooling efficiency of cooling the turbine stationary components with a pressurized temperature-control medium is improved; therefore, the amount of pressurized temperature-control medium used is minimized, and ACC control for maintaining the clearance between the stationary parts and the rotary parts to a minimum value can be reliably carried out.

In this case, the effective use of the pressuring means and so on by sharing them as pressurizing means for boost-up used for closed cooling enables continuous stable rated operation of the gas turbine by performing ACC control with minimum additional equipment, i.e., without adding new equipment.

According to the present invention, at shutdown of the gas turbine, an operation required for cat back prevention can be reliably and quickly carried out by discharging the high-temperature gas in the turbine to the atmosphere or by maintaining the temperature distribution in the turbine in a substantially uniform state.

In particular, by maintaining the temperature distribution in the turbine in a substantially uniform state by letting a pressurized temperature-control medium flow through the turbine-cooling-medium channel in a circulating manner, the operation required for cat back prevention can be completed quickly, and the warm-up operation period at startup can be shortened, even when operation and shutdown of the gas turbine are carried out frequently, such as in a DSS mode.

Furthermore, with regard to additional equipment required for cat back prevention, the effective use of the pressuring means and so on by sharing them as pressurizing means for boost-up used for closed cooling enables stable operation shutdown of the gas turbine by performing ACC control enabling cat back prevention, with minimum additional equipment, i.e., without adding new equipment.

DESCRIPTION OF EMBODIMENTS

Embodiments of a gas turbine according to the present invention and an operating method thereof will be described below on the basis of the drawings.

First Embodiment

Figure 1:
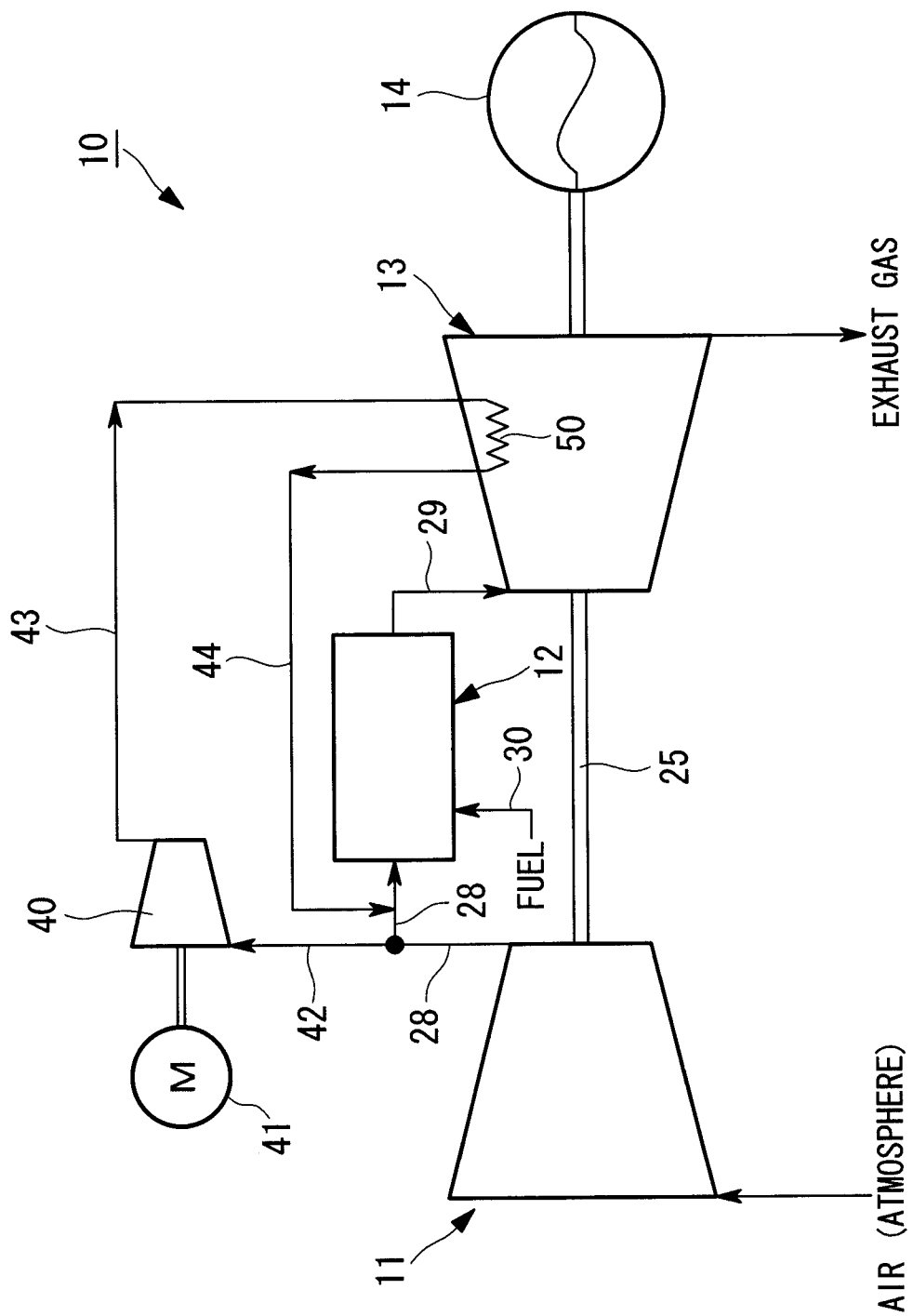
FIG. 1 is a schematic diagram illustrating a gas turbine according to a first embodiment of the present invention and a tenth embodiment of the present invention.
Figure 2:
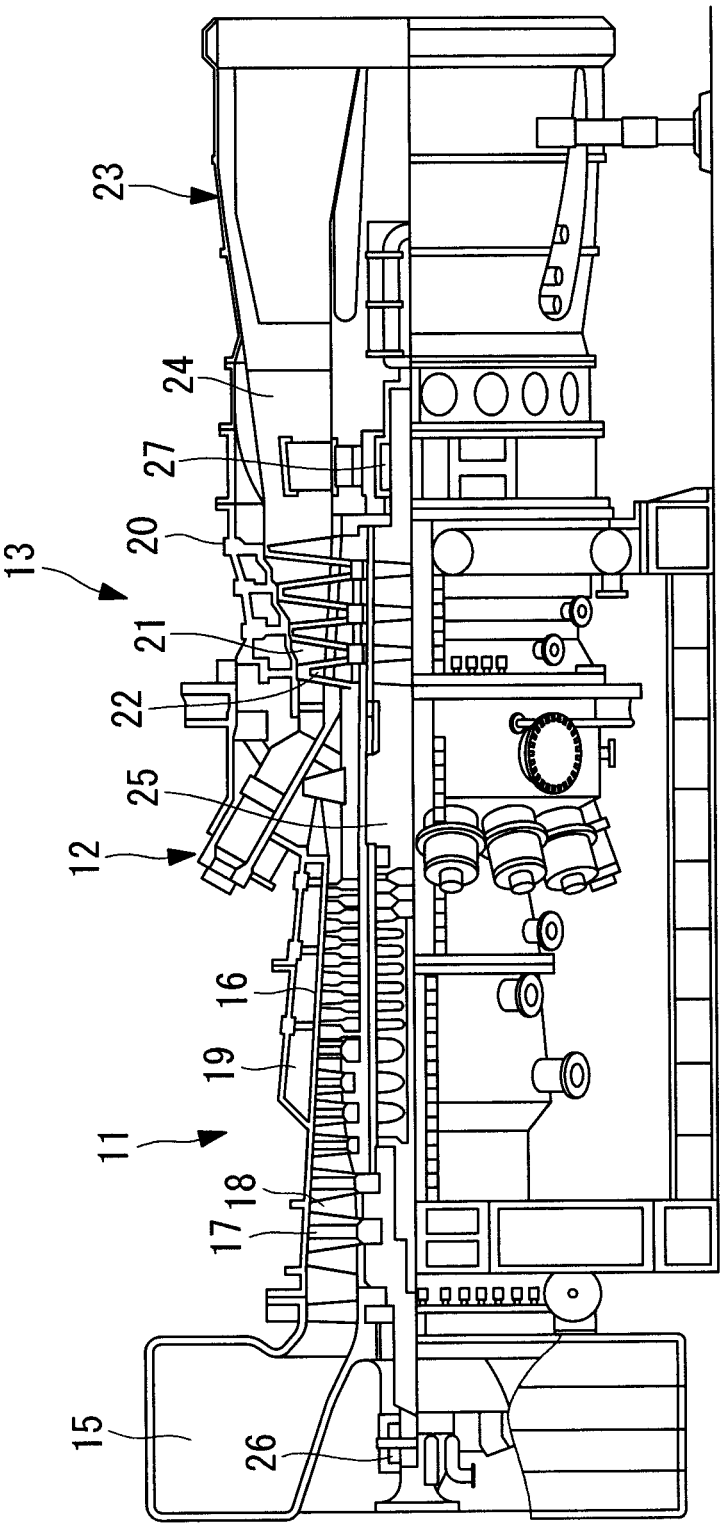
FIG. 2 is a schematic configuration diagram illustrating a configuration example of a gas turbine.
Figure 3:
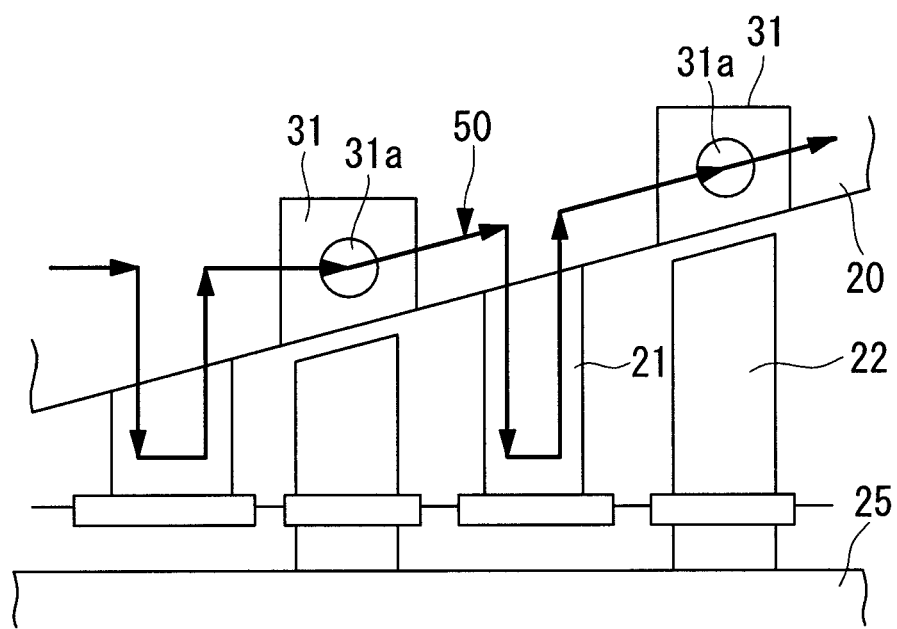
FIG. 3 is a diagram for illustrating a turbine-cooling-medium channel provided through stationary parts of a turbine.

FIG. 1 is a schematic diagram illustrating a gas turbine according to a first embodiment; FIG. 2 is a sectional diagram illustrating, in outline, the configuration of the gas turbine; and FIG. 3 is a schematic configuration diagram illustrating a turbine section of the gas turbine. The illustrated embodiment describes a gas turbine that generates power by driving a generator. The embodiment, however, is not limited thereto.

The illustrated gas turbine 10 is constituted of a compressor 11, a combustor 12, and a turbine 13, and a generator 14 is connected to the turbine 13. The compressor 11 has an air intake port 15 for taking in air and is constituted of a plurality of stator blades 17 and rotor blades 18 disposed in a compressor cylinder 16 in an alternating manner and an extraction manifold 19 disposed at the outer side thereof.

The combustor 12 enables combustion by supplying fuel to compressed air compressed at the compressor 11 and igniting it with a burner.

In the turbine 13, a plurality of stator blades 21 and rotor blades 22 are alternately disposed in a turbine cylinder 20.

An exhaust chamber 23 continuous with the turbine cylinder 20 of the turbine 13 is provided, and the exhaust chamber 23 has an exhaust diffuser 24 continuous with the turbine 13. A rotor (turbine shaft) 25 is positioned such that it passes through the centers of the compressor 11, the combustor 12, the turbine 13, and the exhaust chamber 23, and the end thereof on the compressor 11 side is supported by a bearing 26 in such a manner that it freely rotates, whereas the end thereof on the exhaust chamber 23 side is supported by a bearing 27 in such a manner that it freely rotates. Furthermore, a plurality of disc plates is secured to the rotor 25 to connect the rotor blades 18 and 22, and also a driving shaft of the generator 14 is connected to the end of the rotor 25 on the exhaust chamber 23 side.

Consequently, the air taken in from the air intake port 15 of the compressor 11 is compressed into high-temperature, high-pressure air by passing through the plurality of stator blades 17 and rotor blades 18, and, at the combustor 12, a predetermined amount of fuel supplied to this compressed air is combusted. Subsequently, the high-temperature, high-pressure combustion gas generated at this combustor 12 rotationally drives the rotor 25 by passing through the plurality of stator blades 21 and rotor blades 22, which constitute the turbine 13, and generates power by applying a rotational force to the generator 14 connected to this rotor 25, whereas exhaust gas is released to the atmosphere after being transformed at the exhaust diffuser 24 to have static pressure.

The gas turbine 10, which is configured such that the compressed air compressed by the compressor 11 coaxial with the turbine 13 is combusted in the combustor 12 by supplying fuel thereto and the generated combustion gas is supplied to the turbine 13 to acquire a rotational driving force, is provided with, as illustrated in FIG. 1 for example, a pressurizing device 40, which extracts, from a cylinder, and pressurizes part of the compressed air passed through the shut down compressor 11 or compressed at the compressor 11.

As in FIG. 1, the compressed air compressed by the compressor 11 is supplied to the combustor 12 via a compressed-air supply channel 28 during startup while the load of the gas turbine 10 is being increased to achieve rated operation, during rated operation, and during shut-down while the load is decreased until shut-down, and the combustion gas generated at the combustor 12 is supplied to the turbine 13 via an exhaust channel 29 in a casing. Here, reference numeral 30 in the drawing represents a fuel supply channel.

The pressurizing device 40 is pressurizing means for pressurizing air used as a heating medium, which is described below, and, for example, is a compressor, blower, etc. Moreover, the pressurizing device 40 includes a dedicated motor 41 and is capable of operating independently from the compressor 11, which introduces air for carrying out pressurization. The pressurizing device 40 is desirably shared with, for example, a device that compresses and supplies air for cooling the combustor during rated operation and so on (pressurizing device for boost-up used for closed cooling).

The intake side of the pressurizing device 40 is connected to a branching channel 42 branching from the compressed-air supply channel 28 formed in the cylinder, and the discharge side is connected to a temperature-control-medium supply channel 43. The temperature-control-medium supply channel 43 is a channel for guiding compressed air (pressurized heating medium) to a turbine-cooling-medium channel 50 provided in stationary parts of the turbine 13.

For example, as illustrated in FIG. 3, the turbine-cooling-medium channel 50 is a channel connecting the turbine cylinder 20, the stator blades 21, and a blade ring 31, and is used for temperature control by cooling and heating by letting a temperature-control medium, such as compressed air, flow through the blade ring 31, which is specifically disposed at positions opposing the tips of the rotor blades 22 and which is a stationary component affecting the tip clearance. The blade ring 31 is a member attached to the turbine cylinder 20 in such a manner that it surrounds the outer circumference of the rotor blades 22.

In other words, in this case, the turbine-cooling-medium channel 50 has a structure for cooling the blade ring 31 after cooling the stator blades 21 during gas turbine operation, such as rated operation, by circulating an appropriate temperature-control medium, instead of compressed air, which is a pressurizing heating medium; and by letting compressed air flow in the turbine-cooling-medium channel 50, it can be used for heating the ACC system. Here, reference numeral 31a in the drawing represents a blade-ring channel provided along the entire circumference of the blade ring 31.

The compressed air that had passed through the turbine-cooling-medium channel 50 passes through a temperature-control-medium return channel 44 such that the flow is combined with the compressed-air supply channel 28 and then flows into the combustor 12 via the compressed-air supply channel 28.

Therefore, the pressurizing device 40 is operated at startup (during startup) of the gas turbine and in preparation immediately before startup to let compressed air flow in the turbine-cooling-medium channel 50 and is thus capable of raising the temperature of the stationary components in the ACC system.

That is, when the pressurizing device 40 is operated in preparation before startup of the gas turbine 10, air, which is a heating medium, is taken in from the air intake port 15 of the compressor 11 and is taken in by the pressurizing device 40 via the inside of the compressor 11, the compressed-air supply channel 28, and the branching channel 42. This air is pressurized at the pressurizing device 40 and is transformed into compressed air, which is a pressurized heating medium with a raised temperature, and is then discharged to the temperature-control-medium supply channel 43.

The compressed air discharged to the temperature-control-medium supply channel 43 heats and warms up the stationary components (stationary parts) of the blade ring 31 etc., while flowing through the turbine-cooling-medium channel 50 in the turbine 13. In particular, since increases in temperature and expansion of the blade ring 31 are caused by circulating the compressed air through the blade-ring channel 31a of the blade ring 31, which greatly affects the tip clearance, the tip clearance with respect to the rotor blades 22, which are hardly affected by heating and whose temperature is not changed, is increased.

In this way, the compressed air that heated the stationary components returns to the compressed-air supply channel 28 via the temperature-control-medium return channel 44 and, subsequently, is released to the atmosphere via a combustion-gas channel of the combustor 12 and the turbine 13.

Furthermore, in a similar manner as in the above-described preparation immediately before startup, the pressurizing device 40 is operated at startup (during startup) of the gas turbine to raise the temperature by letting the compressed air flow in the turbine-cooling-medium channel 50. In such a case, upon starting the operation of the compressor 11, the pressurizing device 40 takes in air, which is a heating medium, from the air intake port 15 and introduces part of the main stream of compressed air, which has been compressed inside the compressor 11, for pressurization. The main stream of the compressed air in such a state is at a low pressure compared with that during rated operation and so on and is basically supplied to the combustor 12 via the compressed-air supply channel 28.

However, by operating the pressurizing device 40, part of the main stream of compressed air is taken in by the pressurizing device 40 via the branching channel 42. The temperature of the compressed air taken in by the pressurizing device 40 in this way is raised by pressurization by the pressurizing device 40 and is discharged to the temperature-control-medium supply channel 43 as compressed air, which is a pressurized heating medium.

In this way, the compressed air discharged to the temperature-control-medium supply channel 43 is returned to the compressed-air supply channel 28 via the temperature-control-medium return channel 44 after it flows through the channel in a manner similar to that in preparation immediately before startup, as described above, to heat and warm up the stationary components (stationary parts) of the blade ring 31, etc. That is, since part of the compressed air branching from the main stream of compressed air is used for the purpose of heating the stationary components and is then returned to the compressed-air supply channel 28 such that the flows are combined, the final amount of air supplied to the combustor 12 is not reduced.

In this way, for tip clearance control by the above-described ACC system, since the total amount of air in the main stream of air compressed at the compressor 11 is collected and supplied to the combustor 12 without flowing into the gas path side, the decrease in cycle efficiency is small, and also the amount of NOx can be reduced since a large amount of air for combustion can be ensured. Moreover, since the pressurizing device 40, which supplies compressed air used for heating the stationary components, can be independently operated by the dedicated motor 41, not only can the gas turbine 10 be independently started up as a single unit, but also the time required for startup can be reduced. That is, by operating the pressurizing device 40 independently from the gas turbine main body at startup of the gas turbine 10, clearance control can be carried out by warming up the blade ring 31 by flowing pressurized compressed air to the blade ring 31.

Second Embodiment

Figure 4:
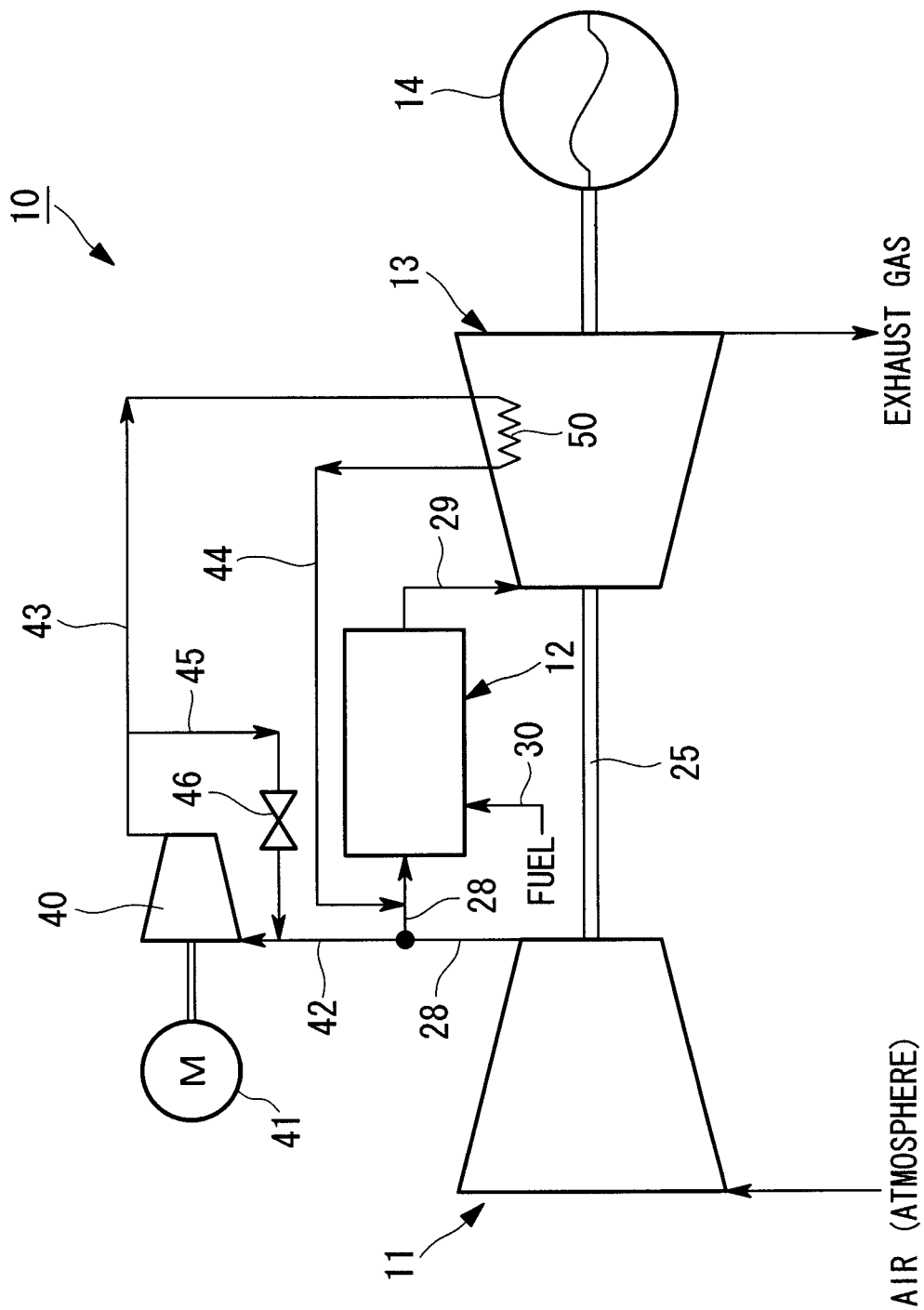
FIG. 4 is a schematic diagram illustrating a gas turbine according to a second embodiment of the present invention.

Next, a gas turbine according to a second embodiment will be described on the basis of FIG. 4. Here, parts that are the same as those according to the above-described embodiment will be represented by the same reference numerals, and detailed descriptions thereof will be omitted.

The gas turbine 10 according to this embodiment has a bypass channel 45 branching from a midpoint in the temperature-control-medium supply channel 43 and connected to the compressed-air supply channel 28, which is a discharge-side channel of the compressor 11. Moreover, an open/close valve 46, serving as channel opening/closing means, is provided at an appropriate position in the bypass channel 45.

In the gas turbine 10 having such a configuration, by opening the open/close valve 46 during clearance control of the ACC system, part of the compressed air with a higher temperature caused by pressurization by the pressurizing device 40 can flow into the bypass channel 45. As a result, the compressed air branching into the bypass channel 45 is taken into the pressurizing device 40 to be pressurized again.

Accordingly, the temperature of the compressed air supplied to the turbine-cooling-medium channel 50 after pressurization by the pressure-raising device 40 increases even more since pressurizing and heating is carried out again on part of the compressed air, and, thus, the amount of time required for startup of the gas turbine 10 can be reduced correspondingly.

Third Embodiment

Figure 5:
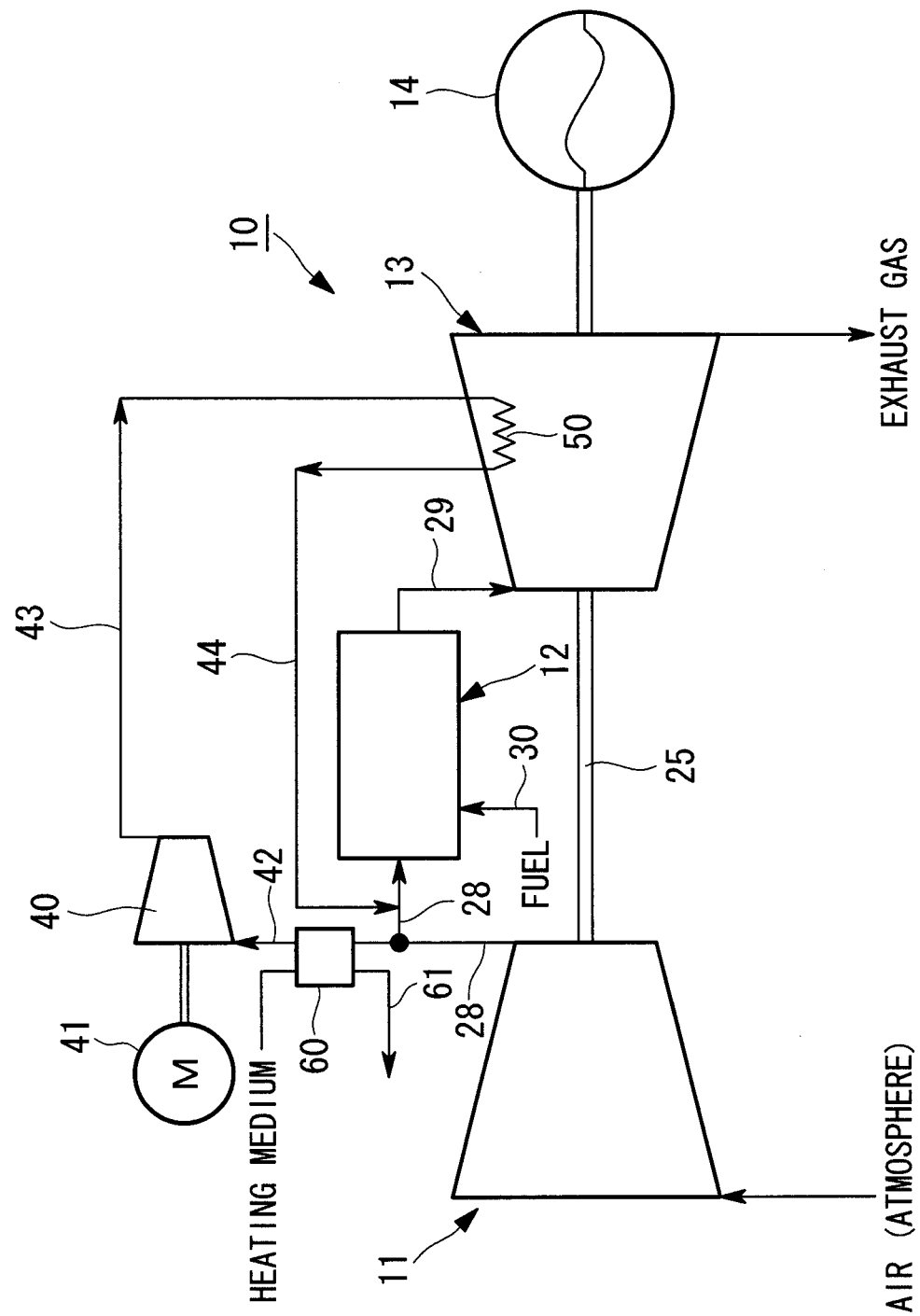
FIG. 5 is a schematic diagram illustrating a gas turbine according to a third embodiment of the present invention.

Next, a gas turbine according to a third embodiment will be described on the basis of FIG. 5. Here, parts that are the same as those according to the above-described embodiment will be represented by the same reference numerals, and detailed descriptions thereof will be omitted.

In the gas turbine 10 according to this embodiment, a heat exchanger (heating means) 60 that exchanges heat with compressed air, which is a heating medium, to raise the temperature thereof is provided in the branching channel 42. This heat exchanger 60 carries out heat exchange between air flowing through the branching channel 42 before the pressurization and a heating medium flowing through a temperature-control-medium channel 61 and heats the compressed air with, for example, high-temperature steam introduced from an exhaust gas boiler, serving as the heating medium.

Accordingly, the gas turbine 10 including the above-described heat exchanger 60 can increase the temperature of the compressed air passing through the turbine-cooling-medium channel 50 even more, and, thus, the amount of time required for starting-up the gas turbine 10 can be reduced correspondingly.

Figure 6:
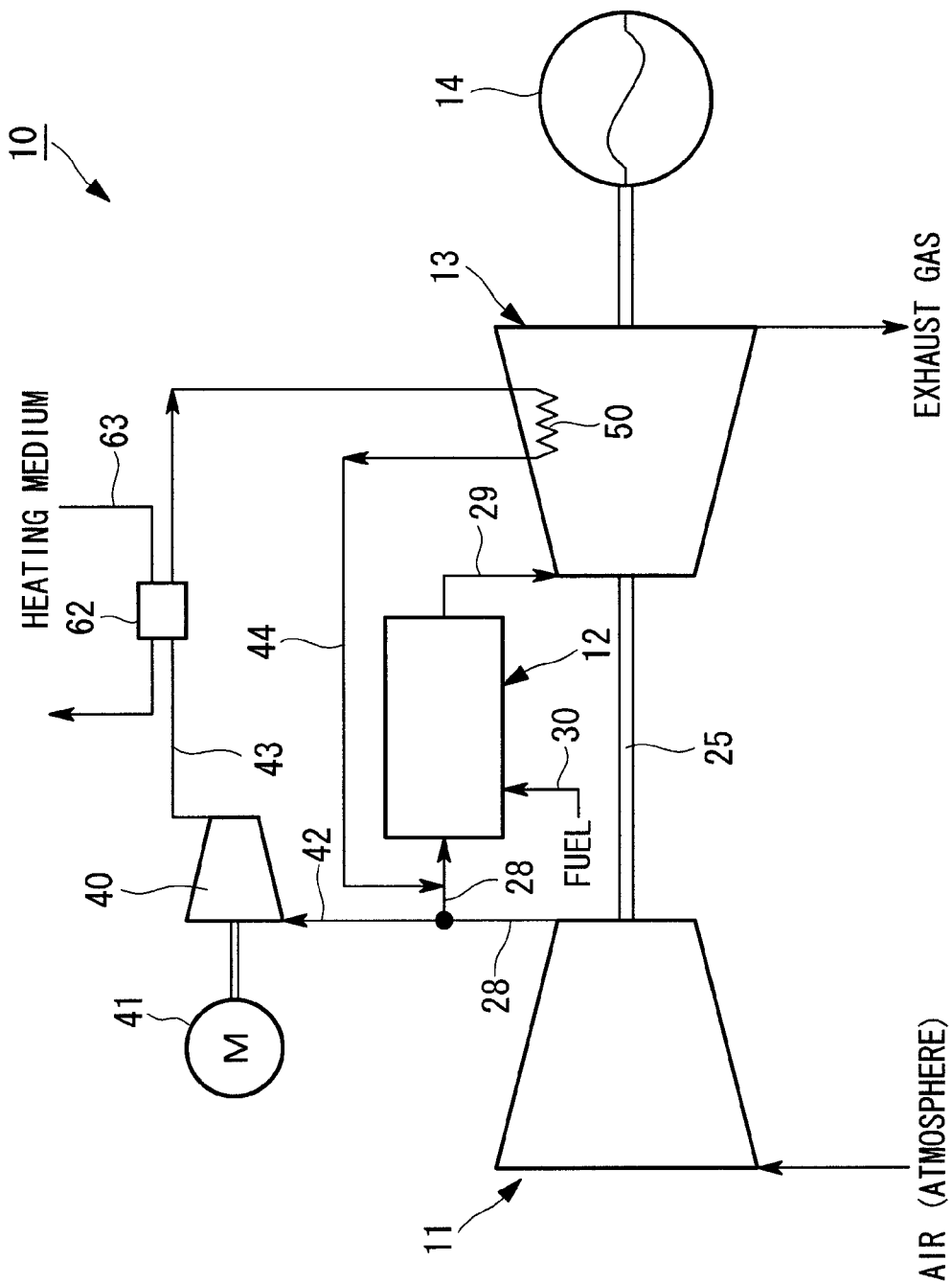
FIG. 6 is a schematic diagram illustrating a modification according to the third embodiment illustrated in FIG. 5.

Furthermore, in the modification illustrated in FIG. 6, a heat exchanger 62 is provided in the temperature-control-medium supply channel 43, and the compressed air pressurized at the pressurizing device 40 is heated by means of a high-temperature heating medium flowing through a temperature-control-medium channel 63. In this way, the temperature of the compressed air flowing through the turbine-cooling-medium channel 50 can be increased even more, and, thus, the amount of time required for starting-up the gas turbine 10 can be reduced correspondingly.

Fourth Embodiment

Figure 7:
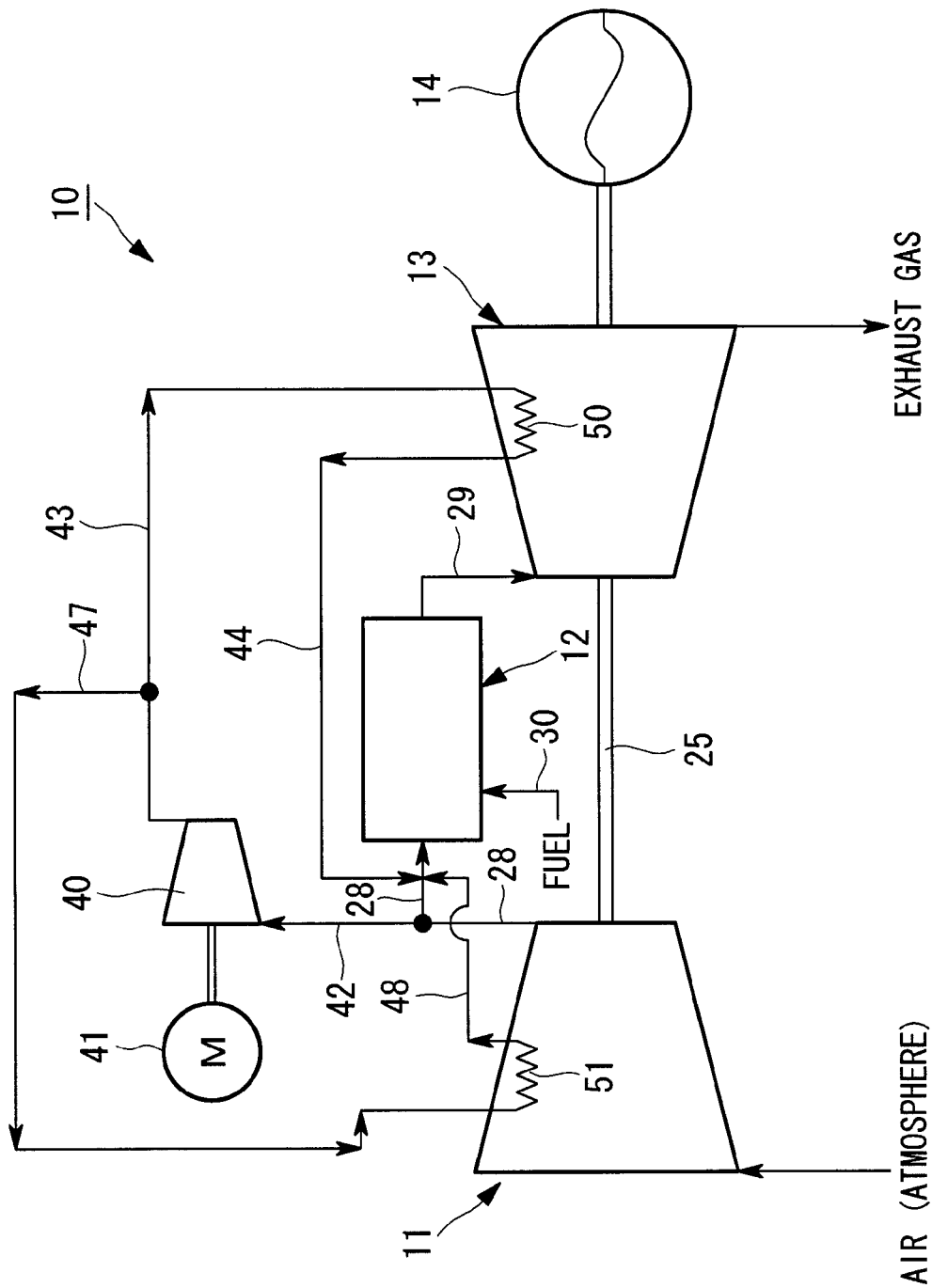
FIG. 7 is a schematic diagram illustrating a gas turbine according to a fourth embodiment of the present invention and a ninth embodiment of the present invention.

Next, a gas turbine according to a fourth embodiment will be described on the basis of FIGS. 7 and 8. Here, parts that are the same as those according to the above-described embodiment will be represented by the same reference numerals, and detailed descriptions thereof will be omitted.

The gas turbine 10 according to this embodiment has a heating-medium branching supply channel 47 that branches from the temperature-control-medium supply channel 43 and that is connected to a compressor cooling-medium channel 51, and a heating-medium branching return channel 48 that guides the compressed air that has passed through the compressor cooling-medium channel 51 to the compressed-air supply channel 28 such that the flows are combined.

Figure 8:
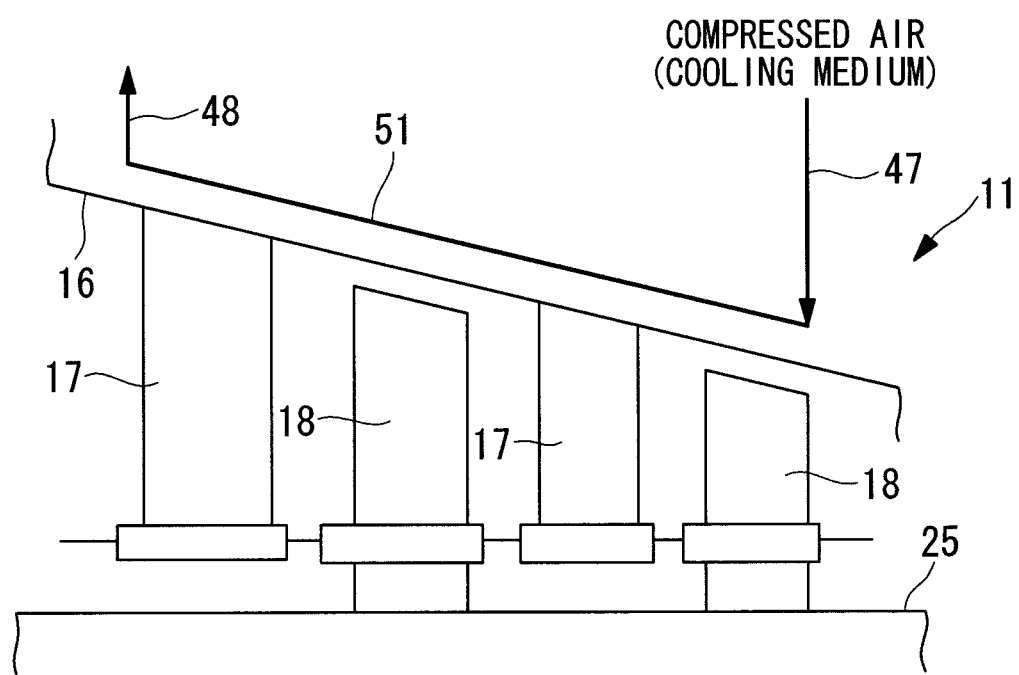
FIG. 8 is a diagram for illustrating a compressor-cooling-medium channel provided on stationary parts of a compressor.

FIG. 8 is a diagram illustrating the outline of the compressor cooling-medium channel 51 provided in the compressor cylinder 16. This compressor cooling-medium channel 51 is a channel for cooling the stationary components of the compressor 11 by letting a cooling medium flow during normal operation and controls the tip clearance formed between the rotor blades 18 of the compressor 11 and the compressor cylinder 16, which is a stationary part.

According to this embodiment, the above-described compressor cooling-medium channel 51 is used at startup of the gas turbine, and thereby clearance control can be carried out on the compressor 11 side. Accordingly, since the temperature of not only the stationary components of the gas turbine 10 but also the stationary part on the compressor 11 side can be increased, clearance control of the turbine 13 and the compressor 11 is possible.

Fifth Embodiment

Figure 9:
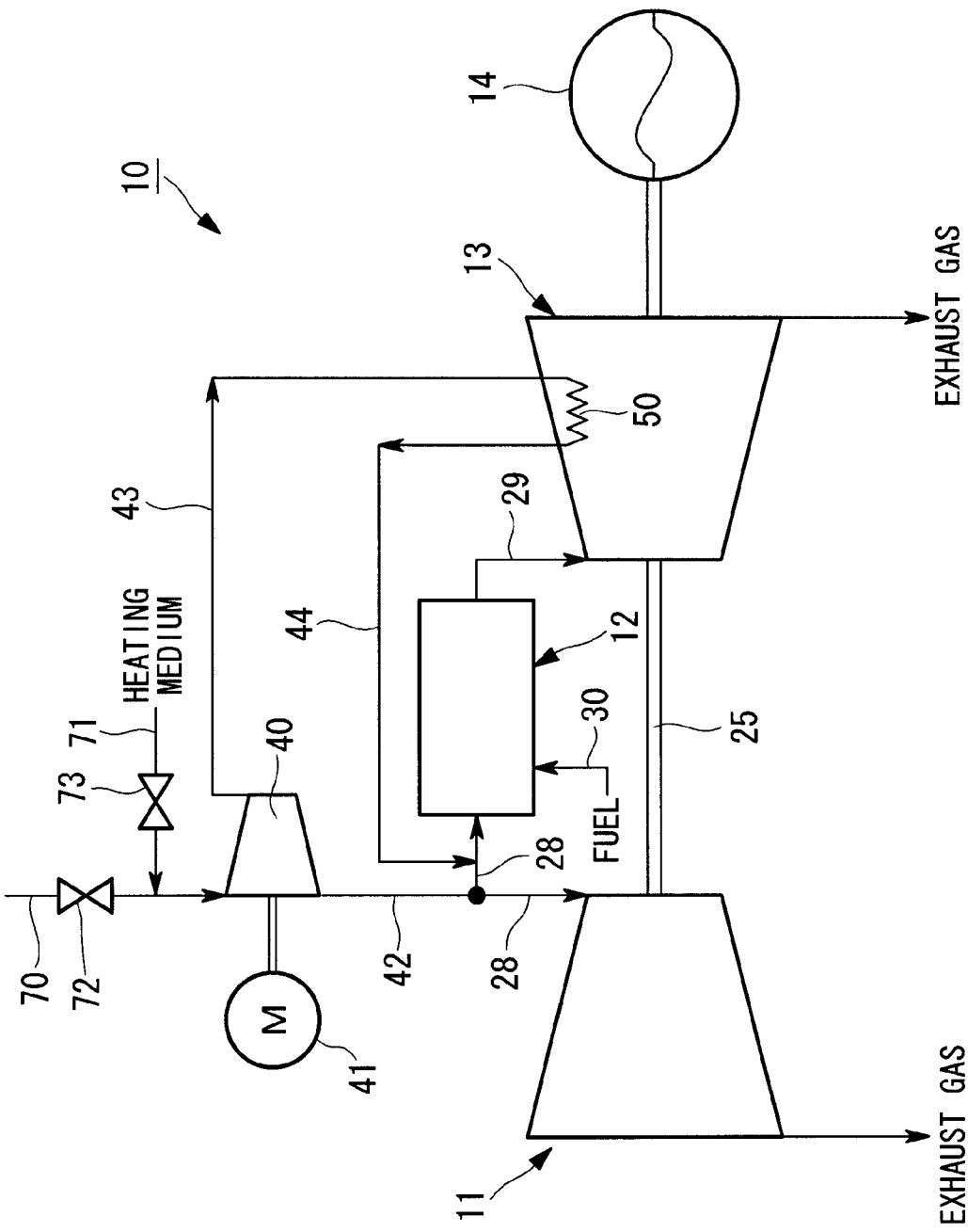
FIG. 9 is a schematic diagram illustrating a gas turbine according to a fifth embodiment of the present invention.

Next, a gas turbine according to a fifth embodiment will be described on the basis of FIG. 9. Here, parts that are the same as those according to the above-described embodiment will be represented by the same reference numerals, and detailed descriptions thereof will be omitted.

The gas turbine 10 according to this embodiment has selective-switching means for heating media on the intake side of the pressurizing device 40. In the illustrated example, the pressurizing device 40 includes an atmosphere-intake channel 70 that directly takes in air from the atmosphere and a heating-medium receiving channel 71 that receives the supply of a high-temperature heating medium, and one of these channels can be selected by the open/close operation of open/ close valves 72 and 73, which are selective-switching means in the channels. Here, as a high-temperature heating medium, for example, high-temperature air, steam, etc., from an exhaust heat boiler or the like may be introduced and used.

With the gas turbine 10 having such a configuration, in the preparation step immediately before startup and so on, the temperature can be increased even more by introducing a high-temperature heating medium from outside the gas turbine 10 if necessary and by pressurizing it at the pressurizing device 40. Therefore, the stationary components of the turbine 13 can be quickly warmed up using a high-temperature pressurizing medium, and thus, the amount of time required for starting-up the gas turbine 10 can be reduced. In this case, the pressurized heating medium that heated the stationary components of the turbine 13 is exhausted as exhaust gas from the turbine 13 and the air intake port 15 of the compressor 11.

Sixth Embodiment

Next, a gas turbine according to a sixth embodiment will be described on the basis of FIGS. 10 and 11. Here, parts that are the same as those according to the above-described embodiment will be represented by the same reference numerals, and detailed descriptions thereof will be omitted.

The gas turbine 10 according to this embodiment has a combustor cooling channel 80 to which compressed air pressurized at the pressurizing device 40 is guided and which is connected in series or in parallel with the turbine-cooling-medium channel 50. That is, the compressed air for heating the stationary components of the turbine 13 passes through the combustor cooling channel 80 connected in series or in parallel to cool required sections in the combustor 12 and is then guided to the compressed-air supply channel 28 such that the flows are combined.

Figure 10:
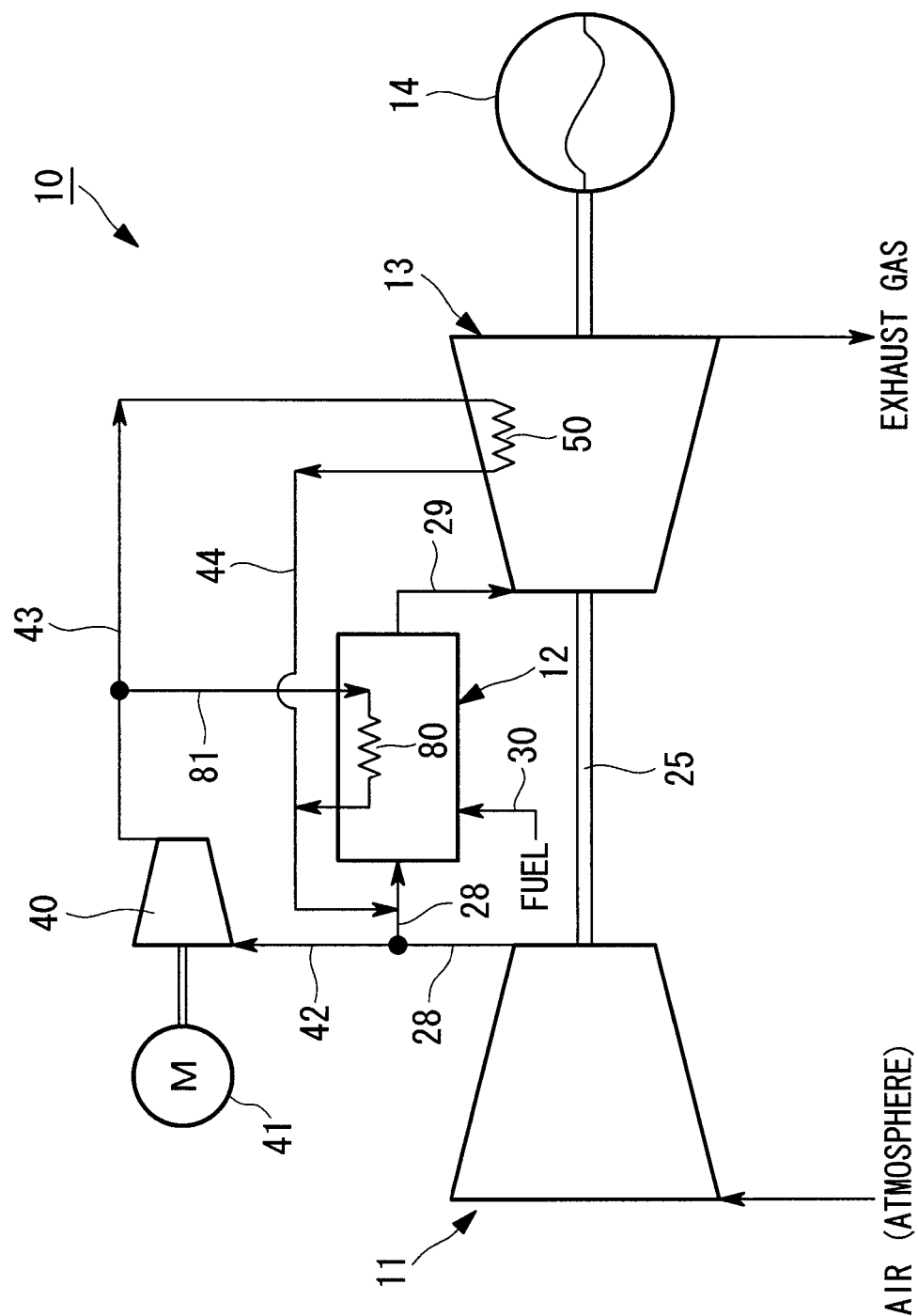
FIG. 10 is a schematic diagram illustrating a gas turbine according to a sixth embodiment of the present invention.

In the configuration example illustrated in FIG. 10, the combustor cooling channel 80 is provided in a temperature-control-medium branching channel 81 branching from temperature-control-medium supply channel 43, and thus, the combustor cooling channel 80 is connected in parallel with the turbine-cooling-medium channel 50.

Figure 11:
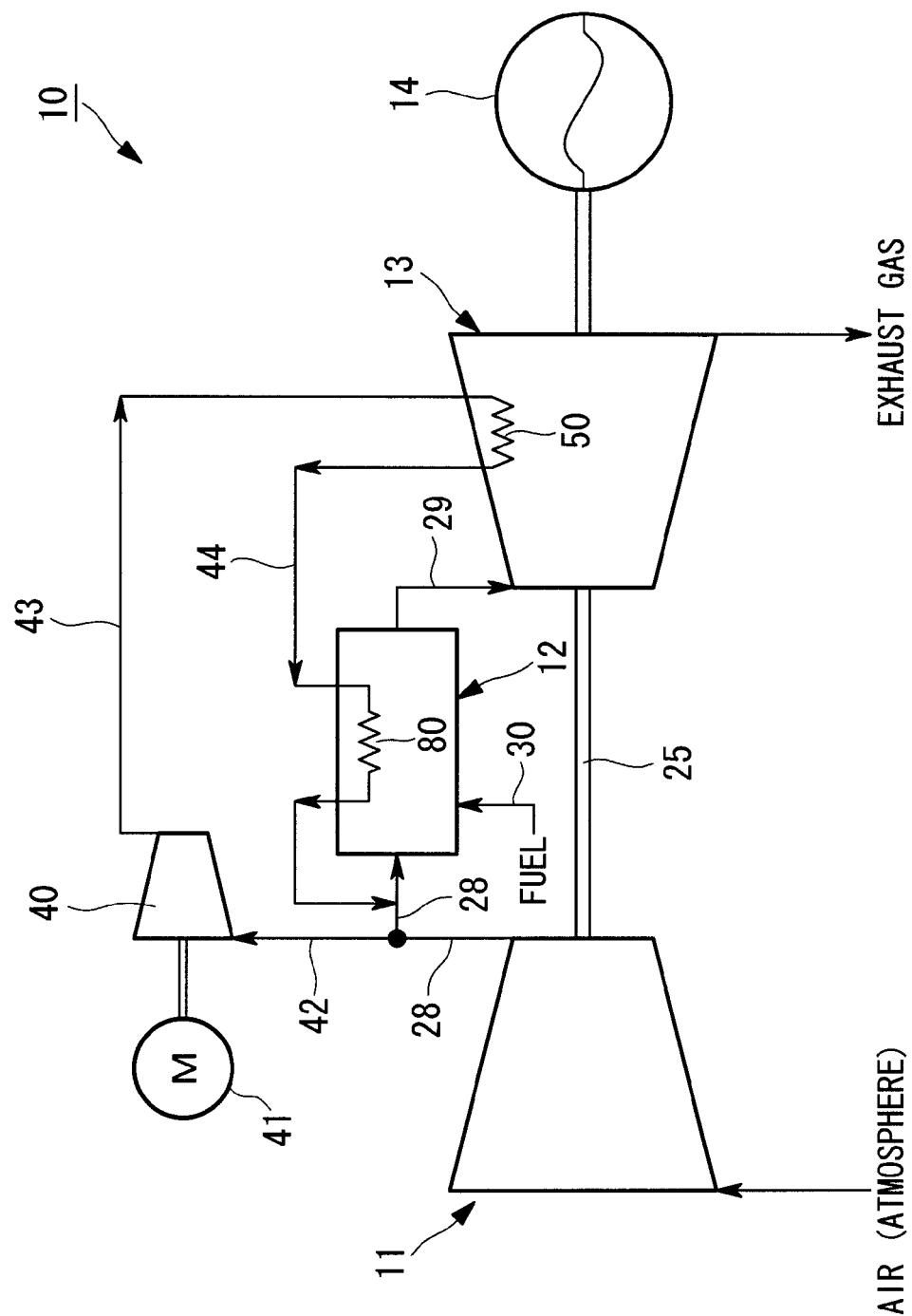
FIG. 11 is a schematic diagram illustrating a modification according to the sixth embodiment illustrated in FIG. 10.
Figure 12A:
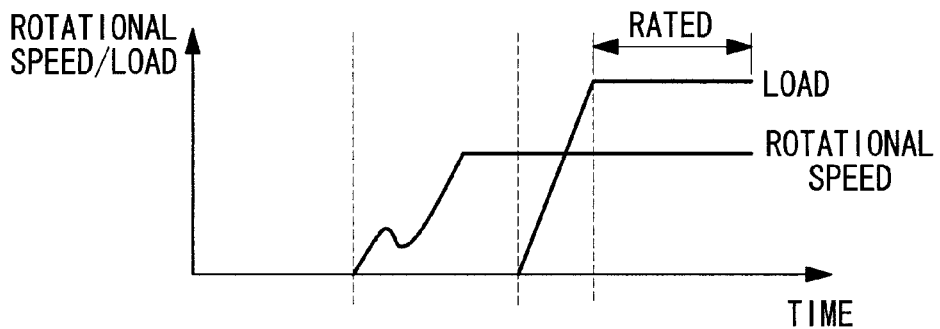
FIG. 12A is a diagram for illustrating an ACC system and illustrates the relationship between time and rotational speed/load.
Figure 12B:
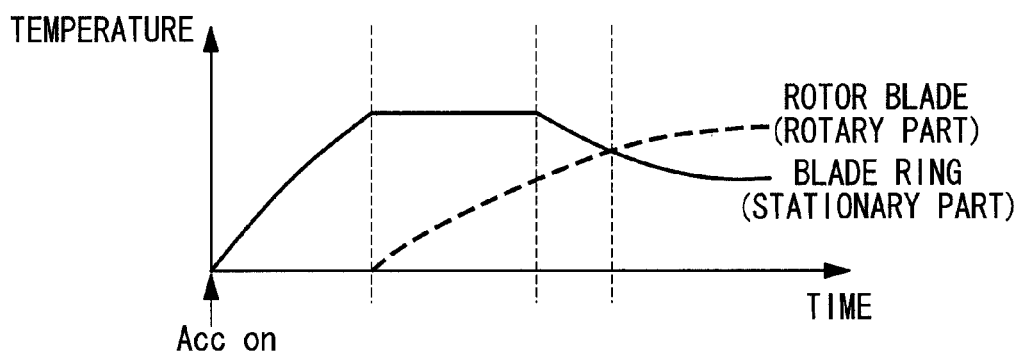
FIG. 12B is a diagram for illustrating the ACC system and illustrates the relationship between time and temperature.
Figure 12C:
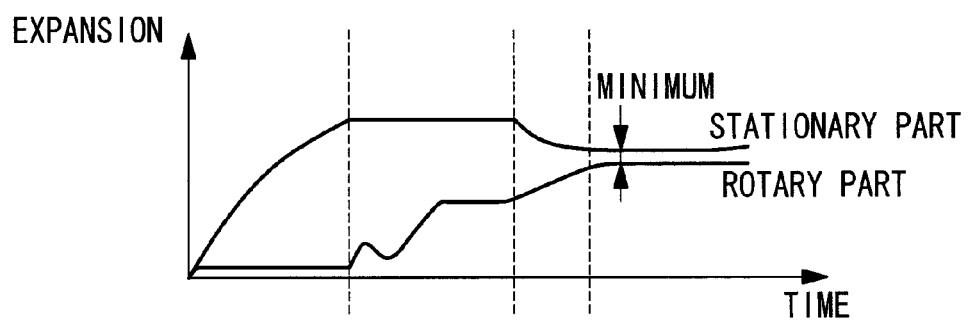
FIG. 12C is a diagram for illustrating the ACC system and illustrates the relationship between time and expansion.
Figure 12D:
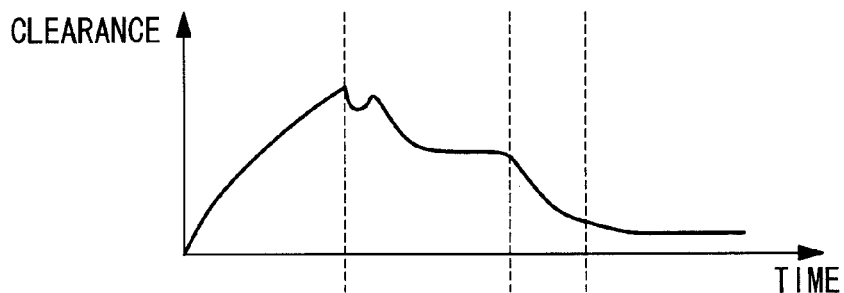
FIG. 12D is a diagram for illustrating the ACC system and illustrates the relationship between time and clearance.

Moreover, in the configuration example illustrated in FIG. 11, as a modification of FIG. 10, the combustor cooling channel 80 is provided in series with the turbine-cooling-medium channel 50.

With such a configuration, clearance control of the turbine 13 as well as cooling of the combustor 12 can be carried out using a single pressurizing device 40. Therefore, in the gas turbine 10 provided with, for example, pressurizing means that extracts part of the compressed air compressed at the compressor 11 for cooling the combustor 12 and that supplies the cooling medium, which is a pressurized form of this compressed air, to the combustor 12, the pressurizing means can be shared with the pressurizing device 40 for the above-described ACC system. In other words, another pressurizing device 40 does not have to be provided for the above-described ACC system.

In this way, the gas turbine 10 according to the above-described embodiments employ the startup operating method described below during preparation immediately before startup and at startup.

In other words, carried out at startup of the gas turbine and in preparation immediately before startup are a step in which the pressurizing device 40, which is connected to the branching channel 42 branching from the discharge side of the compressor 11 and which can operate independently from the compressor, introduces and pressurizes the air, which is a heating medium; a step in which compressed air pressurized at the pressurizing device 40 is supplied to the turbine-cooling-medium channel 50 provided in the stationary components of the turbine 13 to raise the temperature of the stationary components with the compressed air passing through the turbine-cooling-medium channel 50; and a step in which the compressed air is guided from the turbine-cooling-medium channel 50 to the compressed-air supply channel 28 such that the flows are combined.

Accordingly, the compressed air which has an increased temperature due to pressurization by the pressurizing device 40 heats and warms up the stationary components of the turbine 13 when passing through the turbine-cooling-medium channel 50. At this time, since the pressurizing device 40 can operate independently from the gas turbine main body, clearance control can be carried out quickly in preparation immediately before startup, even when the gas turbine main body has not been started up.

That is, according to the present invention described above, quick operation control of the ACC system is carried out at startup of the gas turbine and in preparation immediately before startup, and the startup speed of the gas turbine can be increased. In other words, at startup of the gas turbine and in preparation immediately before startup, since ACC control in which the stationary components are expanded by quickly warming them up to a desired temperature and increasing the clearance between the stationary parts and the rotary parts to an optimal value is possible, the startup speed of the gas turbine can be increased by decreasing the time required for startup preparation of the gas turbine 10. Therefore, the amount of actual operation time during which the gas turbine 10 is operated to drive the generator 14 is increased, and thus, the equipment operation efficiency of the gas turbine 10 is improved.

Furthermore, the effective use of the pressuring means and so on by sharing them for boost-up used for closed cooling realizes high-speed startup of the gas turbine by performing ACC control with minimum additional equipment, i.e., without adding new equipment.

Seventh Embodiment

Figure 13:
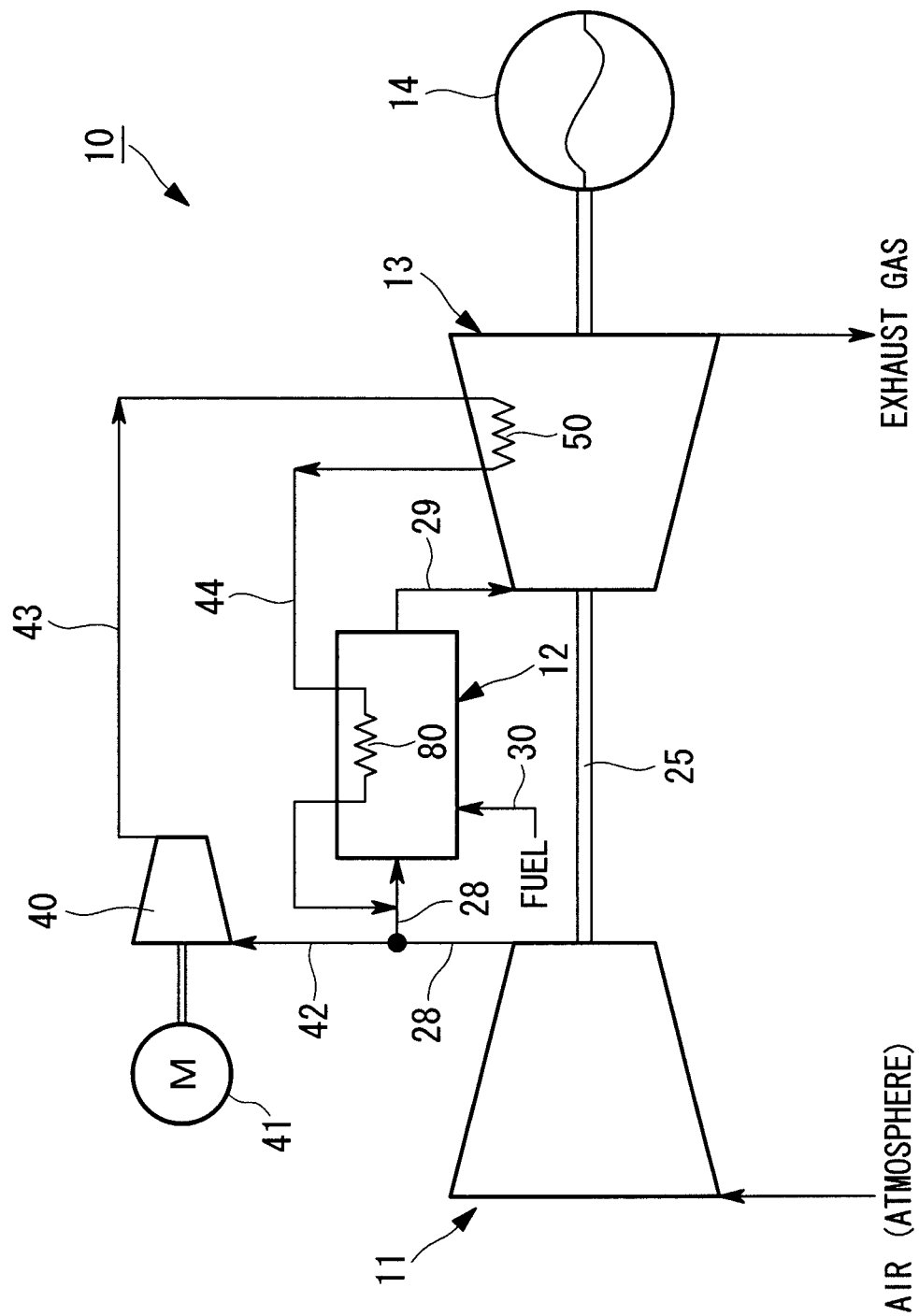
FIG. 13 is a schematic diagram illustrating a gas turbine according to a seventh embodiment of the present invention.

FIG. 13 is a schematic diagram illustrating a gas turbine according to a seventh embodiment. Since the sectional diagram illustrating the schematic configuration diagram of the gas turbine according to this embodiment and the schematic configuration diagram illustrating the turbine section are the same as those of the first embodiment, this embodiment will also be described with reference to FIGS. 2 and 3, and parts that are the same as those according to the first embodiment will be described using the same reference numerals. Here, the illustrated embodiment describes a gas turbine that generates power by driving a generator. The embodiment, however, is not limited thereto.

The illustrated gas turbine 10 is constituted of a compressor 11, a combustor 12, and a turbine 13, and a generator 14 is connected to the turbine 13. The compressor 11 has an air intake port 15 for taking in air and is constituted of a plurality of stator blades 17 and rotor blades 18 disposed in a compressor cylinder 16 in an alternating manner and an extraction manifold 19 disposed at the outer side thereof.

The combustor 12 enables combustion by supplying fuel to compressed air compressed at the compressor 11 and igniting it with a burner.

In the turbine 13, a plurality of stator blades 21 and rotor blades 22 are alternately disposed in a turbine cylinder 20.

An exhaust chamber 23 continuous with the turbine cylinder 20 of the turbine 13 is provided, and the exhaust chamber 23 has an exhaust diffuser 24 continuous with the turbine 13. A rotor (turbine shaft) 25 is positioned such that it passes through the centers of the compressor 11, the combustor 12, the turbine 13, and the exhaust chamber 23, and its end on the compressor 11 side is supported by a bearing 26 in such a manner that it freely rotates, whereas its end on the exhaust chamber 23 side is supported by a bearing 27 in such a manner that it freely rotates. Furthermore, a plurality of disc plates is secured to the rotor 25 to connect the rotor blades 18 and 22, and also a driving shaft of the generator 14 is connected to the end of the rotor 25 on the exhaust chamber 23 side.

Consequently, the air taken in from the air intake port 15 of the compressor 11 is compressed into high-temperature, high-pressure air by passing through the plurality of stator blades 17 and rotor blades 18, and, at the combustor 12, a predetermined amount of fuel supplied to this compressed air is combusted. Subsequently, the high-temperature, high-pressure combustion gas generated at this combustor 12 rotationally drives the rotor 25 by passing through the plurality of stator blades 21 and rotor blades 22, which constitute the turbine 13, and generates power by applying a rotational force to the generator 14 connected to this rotor 25, whereas exhaust gas is released to the atmosphere after being transformed at the exhaust diffuser 24 to have static pressure.

The gas turbine 10, which is configured such that the compressed air compressed by the compressor 11 is combusted in the combustor 12 by supplying fuel thereto and the generated combustion gas is supplied to the turbine 13 to acquire a rotational driving force, is provided with, as illustrated in FIG. 1 for example, a pressurizing device 40, which extracts, from a cylinder, and pressurizes part of the compressed air passed through the shut down compressor 11 or compressed at the compressor 11.

As in FIG. 13, the compressed air compressed by the compressor 11 is supplied to the combustor 12 via a compressed-air supply channel 28 during startup while the load of the gas turbine 10 is being increased to achieve rated operation, during rated operation, and during shut-down while the load is decreased until shut-down, and the combustion gas generated at the combustor 12 is supplied to the turbine 13 via an exhaust channel 29 in a casing. Here, reference numeral 30 in the drawing represents a fuel supply channel.

The pressurizing device 40 is pressurizing means for pressurizing air used as a temperature-control medium (heating medium or cooling medium), which is described below, and, for example, is a compressor, blower, etc. Moreover, the pressurizing device 40 includes a dedicated motor 41 and is capable of operating independently from the compressor 11, which introduces air for performing pressurization. The pressurizing device 40 is desirably shared with, for example, a device that compresses and supplies air for cooling the combustor during rated operation and so on (pressurizing device for boost-up used for closed cooling).

The intake side of the pressurizing device 40 is connected to a branching channel 42 branching from the compressed-air supply channel 28 formed in the cylinder, and the discharge side is connected to a temperature-control-medium supply channel 43. The temperature-control-medium supply channel 43 is a channel for guiding compressed air (pressurized temperature-control medium) to a turbine-cooling-medium channel 50 provided in stationary parts of the turbine 13.

For example, as illustrated in FIG. 3, the turbine-cooling-medium channel 50 is a channel connecting the turbine cylinder 20, the stator blades 21, and a blade ring 31, and is used for temperature control by cooling and heating by specifically letting compressed air flow through the blade ring 31, which is disposed at positions opposing the tips of the rotor blades 22 and which is a stationary component affecting the tip clearance. The blade ring 31 is a member attached to the turbine cylinder 20 in such a manner that it surrounds the outer circumference of the rotor blades 22.

In other words, the turbine-cooling-medium channel 50 has a structure in which the blade ring 31 is cooled after cooling the stator blades 21 during rated operation etc. of the gas turbine 10 by circulating compressed air having a relatively low temperature. Furthermore, this turbine-cooling-medium channel 50 has a structure in which the stator blades 21 and the blade ring 31 are heated and warmed up by letting compressed air having a relatively high temperature flow in preparation immediately before starting up the gas turbine 10, during startup, and during shutdown. Thus, this turbine-cooling-medium channel 50 can be used for cooling and heating stationary components in the ACC system. Here, reference numeral 31a in the drawing represents a blade-ring channel provided along the entire circumference of the blade ring 31.

The compressed air that has passed through the turbine-cooling-medium channel 50 passes through a temperature-control-medium return channel 44 such that the flow is combined with the compressed-air supply channel 28 and then flows into the combustor 12 via the compressed-air supply channel 28.

Therefore, the pressurizing device 40 is operated during rated operation to let compressed air flow in the turbine-cooling-medium channel 50 and is thus capable of raising the temperature of the stationary components in the ACC system.

That is, when the pressurizing device 40 is operated during rated operation of the gas turbine 10, air, which is a temperature-control medium, is taken in from the air intake port 15 of the compressor 11 and is taken in by the pressurizing device 40 via the inside of the compressor 11, the compressed-air supply channel 28, and the branching channel 42. This air is pressurized at the pressurizing device 40 and is transformed into compressed air (pressurized temperature-control medium) through pressurization by the pressurizing device 40 and is then discharged to the temperature-control-medium supply channel 43.

The compressed air discharged to the temperature-control-medium supply channel 43 cools the stationary components (stationary parts) of the blade ring 31 etc., while flowing through the turbine-cooling-medium channel 50 in the turbine 13.
The blade ring 31, which temperature is raised by the thermal effect of the combustion gas In particular, since the blade ring 31, which temperature is raised by the thermal effect of the combustion gas, is cooled by flowing the compressed air through the blade-ring channel 31a of the blade ring 31, which greatly affects the tip clearance, the tip clearance with respect to the rotor blades 22 is adjusted so that it is minimized.

In this way, the compressed air that cooled the stationary components passes through the temperature-control-medium return channel 44 and is guided to the combustor cooling channel 80, which is connected in series with the above-described turbine-cooling-medium channel 50.

The compressed air flowing through the combustor cooling channel 80 cools the required section in the combustor 12 and is then guided through the temperature-control-medium return channel 44 to the compressed-air supply channel 28 such that the flows are combined. This compressed air is used as combustion air of the combustor 12 by being returned to the compressed-air supply channel 28. Therefore, the total amount of compressed air compressed at the compressor 11 is supplied to the combustor 12. That is, since part of the compressed air branching from the main stream of the compressed air is converged with and returned to the compressed-air supply channel 28 after being used for the purpose of cooling stationary components and combustor cooling, the amount of air finally supplied to the combustor 12 is not reduced.

With such a configuration, cooling and clearance control of the turbine 13, as well as cooling of the combustor 12, can be carried out using a single pressurizing device 40. Therefore, in the gas turbine 10 provided with, for example, pressurizing means that extracts part of the compressed air compressed at the compressor 11 for cooling the combustor 12 and that supplies the cooling medium, which is a pressurized form of this compressed air, to the combustor 12, the pressurizing means can be shared with the pressurizing device 40 for the above-described ACC system. In other words, another pressurizing device 40 does not have to be provided for the above-described ACC system. The temperature and the cooling capacity of the compressed air are adjustable by adjusting the pressure and amount of compressed air by operation control of the pressurizing device 40.

Figure 14:
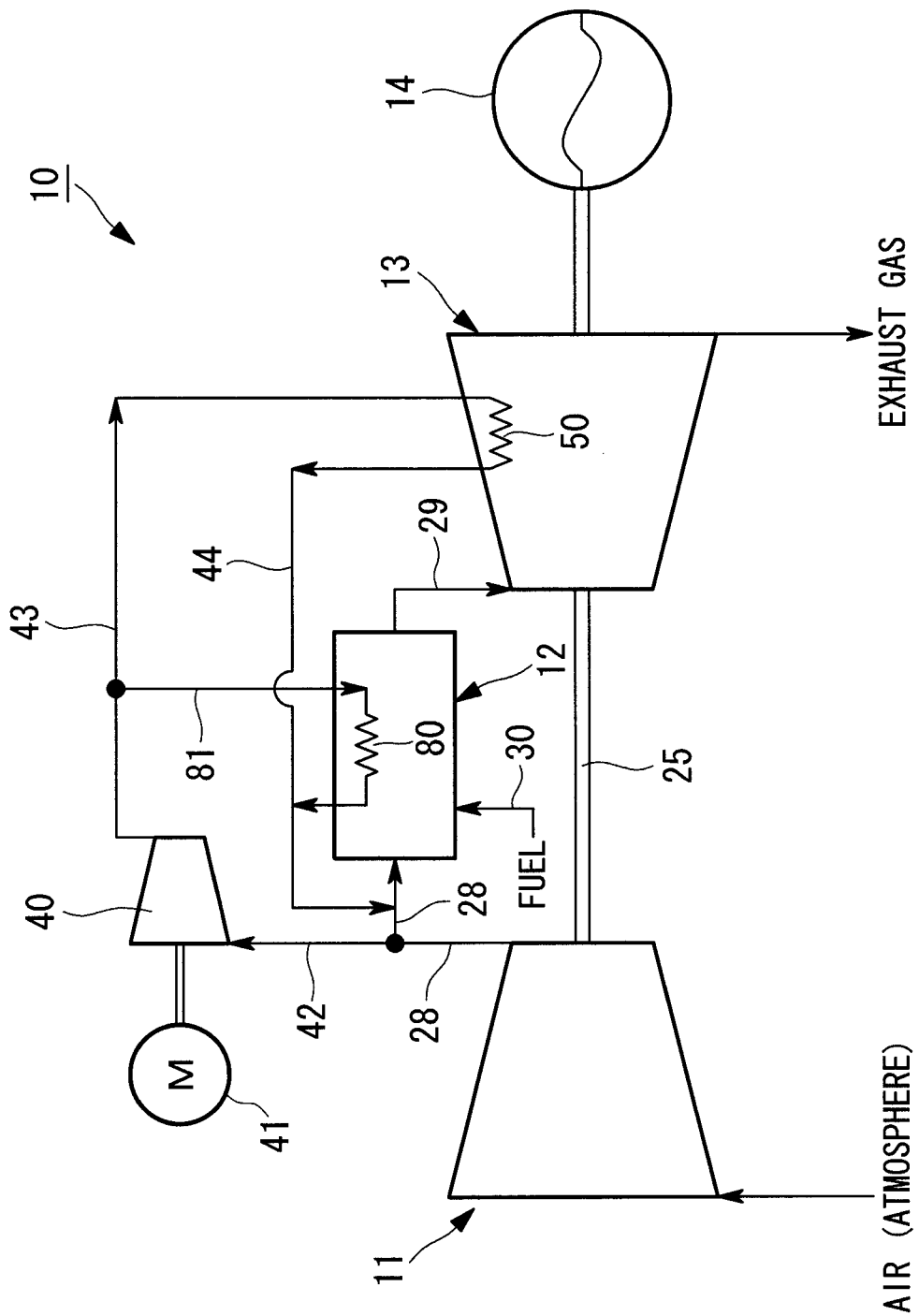
FIG. 14 is a schematic diagram illustrating a modification according to the seventh embodiment illustrated in FIG. 13.

Furthermore, in the modification illustrated in FIG. 14, the combustor cooling channel 80 is provided in parallel with the turbine-cooling-medium channel 50. That is, the combustor cooling channel 80 is provided in the temperature-control-medium branching channel 81 branching from the temperature-control-medium supply channel 43, and the compressed air, after cooling the combustor 12, converges with the flow of the temperature-control-medium return channel 44.

In this way, the gas turbine 10 according to this embodiment includes the combustor cooling channel 80 connected in series or in parallel with the turbine-cooling-medium channel 50; and since the compressed air that cools the stationary components of the turbine 13 passes through the combustor cooling channel 80 by branching off after cooling or before cooling, it cools required sections in the combustor 12 and then converges with the flow in the compressed-air supply channel 28.

Furthermore, in the embodiment and modification illustrated in FIGS. 13 and 14, respectively, the pressure device 40 and its channels are shared for cooling of the combustor 12; instead, however, as in the embodiment described below, it may be used exclusively for the ACC system of the turbine 13.

For tip clearance control by the above-described ACC system, since the entire amount of air in the main stream of compressed air compressed at the compressor 11 is collected and supplied to the combustor 12 without flowing into the gas path side, the decrease in cycle efficiency is small, and, in addition, the amount of NOx can be reduced since a large amount of air for combustion can be ensured.

Moreover, since the above-described pressurizing device 40 can be independently operated by the dedicated motor 41, not only is it possible to start up the gas turbine 10 independently as a single unit in preparation immediately before startup and at startup, but also the time required for startup can be reduced. That is, by operating the pressurizing device 40 independently from the gas turbine main body at startup of the gas turbine 10, pressurized and temperature-raised compressed air flows through the blade ring 31 to warm up the blade ring 31, and thus clearance control can be quickly carried out.

Eighth Embodiment

Figure 15:
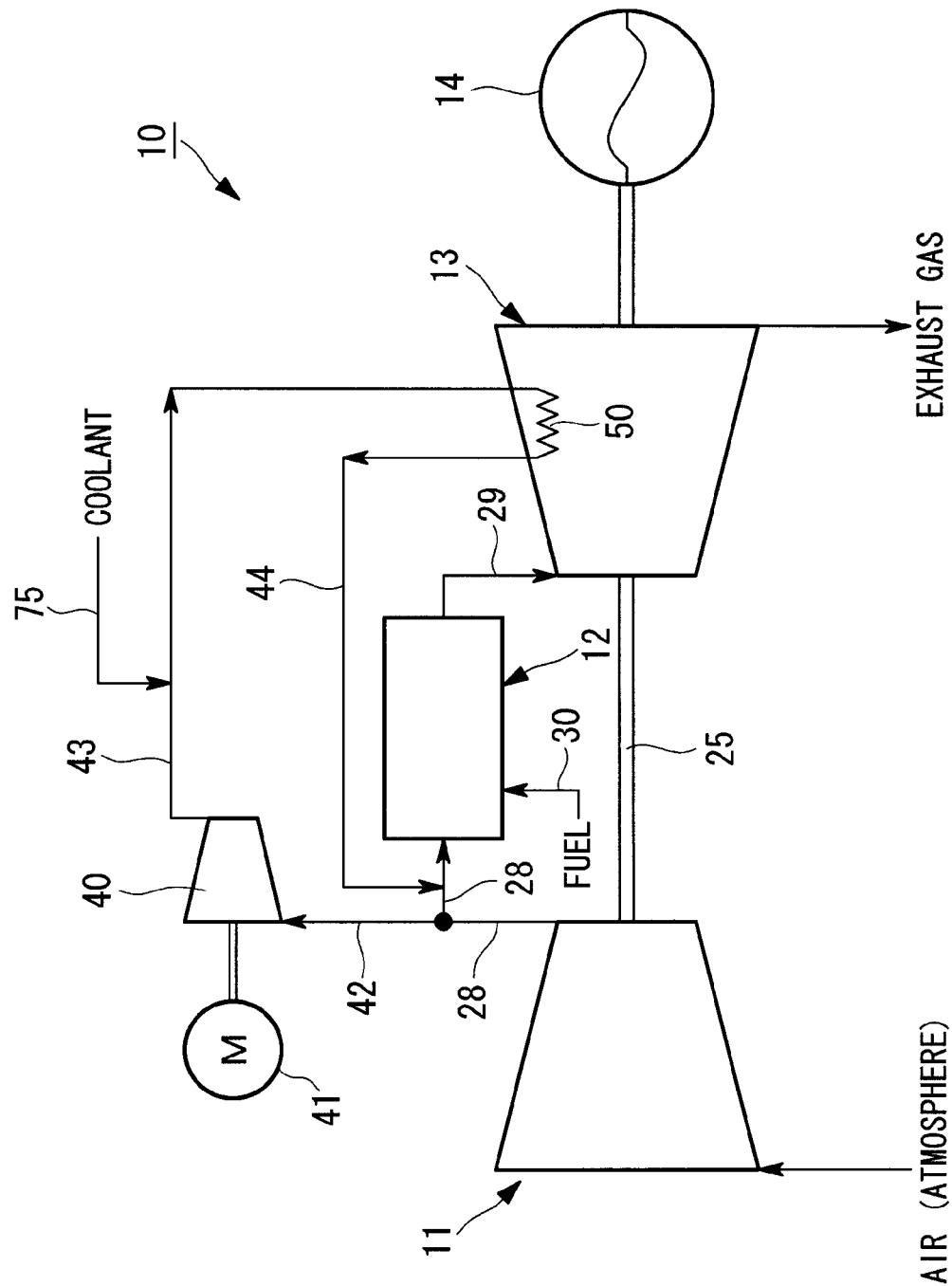
FIG. 15 is a schematic diagram illustrating a gas turbine according to an eighth embodiment of the present invention.

Next, a gas turbine according to an eighth embodiment will be described on the basis of FIGS. 15 to 17. Here, parts that are the same as those according to the above-described embodiment will be represented by the same reference numerals, and detailed descriptions thereof will be omitted.

The gas turbine 10 according to this embodiment has temperature controlling means for enabling temperature control of a pressurized temperature-control medium. The gas turbine 10 illustrated in FIG. 15 includes a coolant supply channel 75, as temperature controlling means, that adds a coolant to the temperature-control-medium supply channel 43. The coolant in this case may be either a gas or a liquid; for example, water mist may be added to compressed air for cooling.

As a result, the temperature of the compressed air raised due to the pressurization carried out by the pressurizing device 40 decreases by adding the coolant, and the relative temperature difference with the stationary components to be cooled increases. Accordingly, since the compressed air can efficiently cool the stationary components due to the large temperature difference, cooling efficiency improves even more.

Here, by adding water as a coolant, the cycle efficiency of the gas turbine 10 decreases, but an increase in power output and a decrease in NOx are possible.

Figure 16:
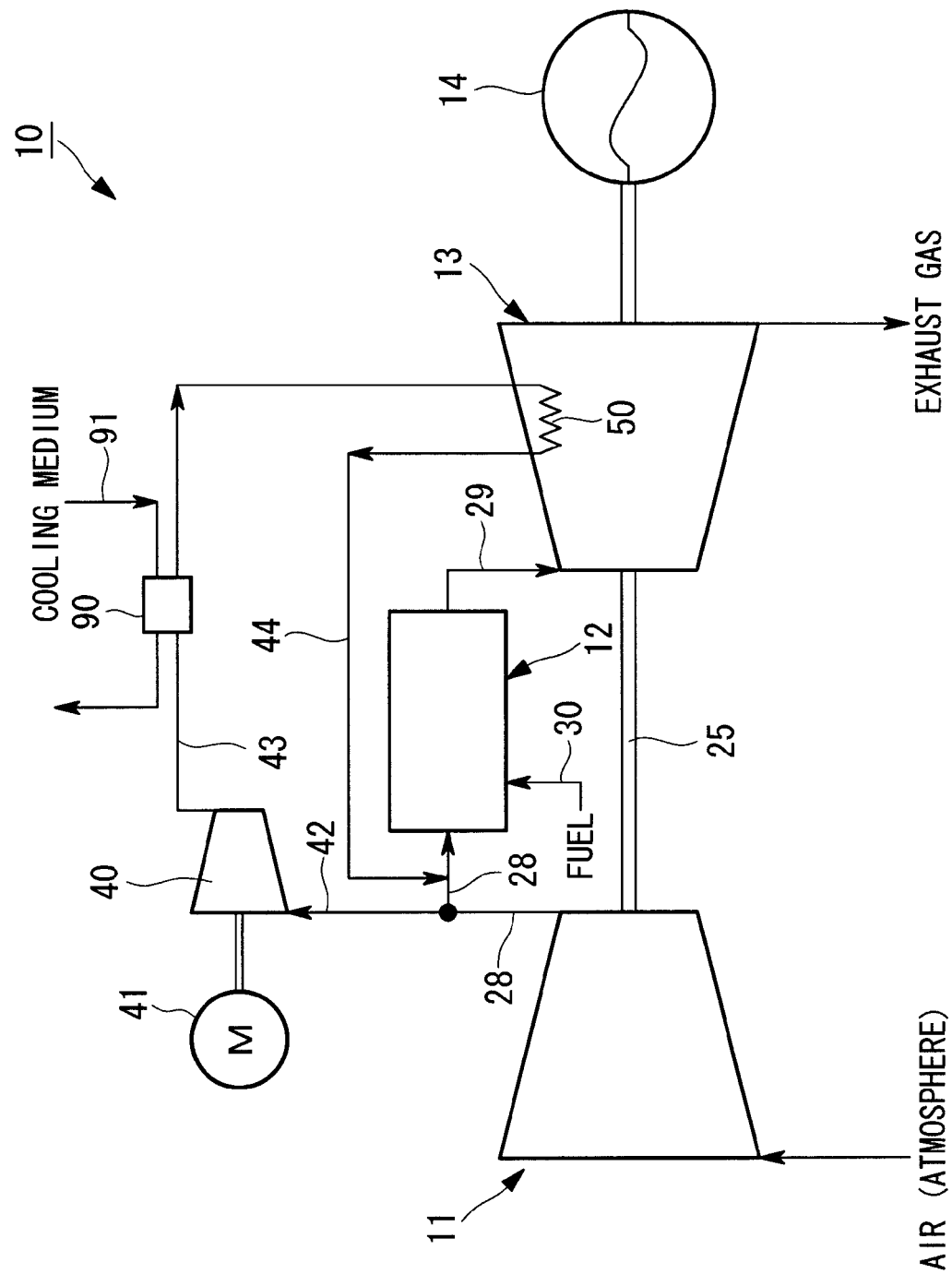
FIG. 16 is a schematic diagram illustrating a first modification according to the eighth embodiment illustrated in FIG. 15.

Furthermore, in a first modification illustrated in FIG. 16, a heat exchanger 90, which is temperature controlling means, is provided in the temperature-control-medium supply channel 43. This heat exchanger 90 decreases the temperature of compressed air by carrying out heat exchange between a cooling medium flowing through a cooling-medium channel 91 and compressed air flowing through the temperature-control-medium supply channel 43. The cooling medium that can be used here includes cylinder air, fuel, supply water to the steam turbine, steam for the steam turbine, and so on.

Figure 17:
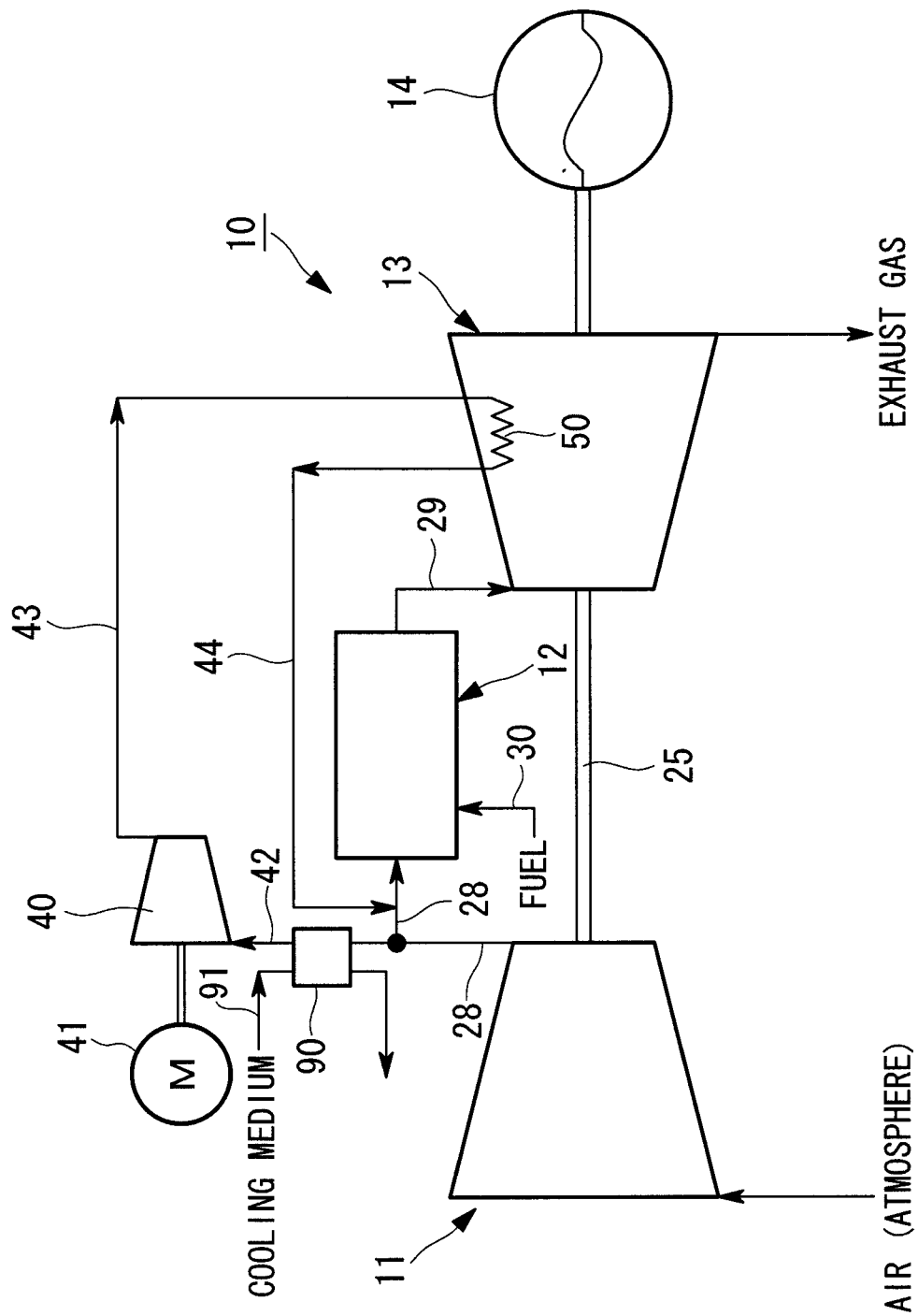
FIG. 17 is a schematic diagram illustrating a second modification according to the eighth embodiment illustrated in FIG. 15.

Furthermore, in a second modification illustrated in FIG. 17, the above-described heat exchanger 90 is provided in the branching channel 42 and decreases the air temperature before pressurization is carried out by the pressurizing device 40. As the cooling medium in this case, it is also possible to use cylinder air, fuel, supply water to the steam turbine, steam for the steam turbine, and so on.

In this way, by providing the heat exchanger 90, the air temperature of the compressed air before pressurization or the compressed air temperature after pressurization by the pressurizing device 40 can be decreased through heat exchange with the cooling medium; therefore, efficient cooling is possible due to a lowering in the temperature of the compressed air that cools the stationary components during rated operation.

Ninth Embodiment

Next, a gas turbine according to a ninth embodiment will be described on the basis of FIGS. 7 and 8. Since the schematic configuration diagrams of the gas turbine according to this embodiment are the same as those according to the fourth embodiment, this embodiment will also be described with reference to FIGS. 7 and 8. Here, parts that are the same as those according to the above-described embodiment will be represented by the same reference numerals, and detailed descriptions thereof will be omitted.

The gas turbine 10 according to this embodiment has a heating-medium branching supply channel 47 that branching from the temperature-control-medium supply channel 43 and that is connected to a compressor cooling-medium channel 51, and a heating-medium branching return channel 48 that guides the compressed air passing through the compressor cooling-medium channel 51 to converge with the flow of the compressed-air supply channel 28.

FIG. 8 is a diagram illustrating the outline of the compressed-air cooling-medium channel 51 provided in the compressor cylinder 16. This compressed-air cooling-medium channel 51 is a channel for cooling the stationary components of the compressor 11 by letting a cooling medium flow during normal operation and controls the tip clearance between the rotor blades 18 of the compressor 11 and the compressor cylinder 16, which is a stationary part.

According to this embodiment, the above-described compressed-air cooling-medium channel 51 is used at startup of the gas turbine, and clearance control can be carried out on the compressor 11 side. Accordingly, since the temperature of not only the stationary components of the turbine 10 but also the stationary part on the compressor 11 side can be raised, clearance control of the turbine 13 and the compressor 11 is possible.

In this way, the gas turbine 10 according to the above-described embodiment employs the rated-operation operating method during rated operation described below.

In other words, the rated-operation method for the gas turbine 10 includes a step in which the pressurizing device 40, which is connected to the branching channel 42 branching from the compressed-air supply channel 28 of the compressor 11 and can operate independently from the compressor, introduces and pressurizes air; a step in which compressed air pressurized at the pressurizing device 40 is supplied to the turbine-cooling-medium channel 50 provided in the stationary components of the turbine 13 and cools the stationary components with the compressed air passing through the turbine-cooling-medium channel 50; and a step in which the compressed air is guided to and flows into the compressed-air supply channel 28 from the turbine-cooling-medium channel 50.

Accordingly, during rated operation of the gas turbine, cooling can be carried out efficiently due to the temperature difference between the stationary components of the turbine 13 and the compressed air, and operation is possible with the tip clearance set to a minimum state. It is desirable that the compressed air in this case increase cooling efficiency by having a temperature lowered by injecting the above-described coolant or installing the heat exchanger 90.

In this way, according to the gas turbine and its rated-operation method according to above-described present invention, in the ACC system operated during rated operation of the gas turbine, the cooling efficiency of cooling of the turbine stationary components with compressed air is improved; therefore, the amount of compressed air used is minimized, and ACC control for maintaining the clearance between the stationary parts and the rotary parts at a minimum can be reliably carried out. In such a case, effective use of the pressurizing device 40 and so on by sharing them for boost-up used for closed cooling enables continuous stable rated operation of the gas turbine by carrying out control of the ACC system by minimizing the addition of additional equipment, i.e., without adding new equipment.

Tenth Embodiment

FIG. 1 is a schematic diagram illustrating a gas turbine according to a tenth embodiment. Since the sectional diagram illustrating the schematic configuration diagram of the gas turbine according to this embodiment and the schematic configuration diagram illustrating the turbine section are the same as those according to the first embodiment, this embodiment will also be described with reference to FIGS. 2 and 3, and parts that are the same as those according to the first embodiment will be represented by the same reference numerals. The illustrated embodiment describes a gas turbine that generates power by driving a generator. The embodiment, however, is not limited thereto.

The illustrated gas turbine 10 is constituted of a compressor 11, a combustor 12, and a turbine 13, and a generator 14 is connected to the turbine 13. The compressor 11 has an air intake port 15 for taking in air and is constituted of a plurality of stator blades 17 and rotor blades 18 disposed in a compressor cylinder 16 in an alternating manner and an extraction manifold 19 disposed at the outer side thereof.

The combustor 12 enables combustion by supplying fuel to compressed air compressed at the compressor 11 and igniting it with a burner.

In the turbine 13, a plurality of stator blades 21 and rotor blades 22 are alternately disposed in a turbine cylinder 20.

An exhaust chamber 23 continuous with the turbine cylinder 20 of the turbine 13 is provided, and the exhaust chamber 23 has an exhaust diffuser 24 continuous with the turbine 13. A rotor (turbine shaft) 25 is positioned such that it passes through the centers of the compressor 11, the combustor 12, the turbine 13, and the exhaust chamber 23, and the end thereof on the compressor 11 side is supported by a bearing 26 in such a manner that it freely rotates, whereas the end thereof on the exhaust chamber 23 side is supported by a bearing 27 in such a manner that it freely rotates. Furthermore, a plurality of disc plates is secured to the rotor 25 to connect the rotor blades 18 and 22, and also a driving shaft of the generator 14 is connected to the end of the rotor 25 on the exhaust chamber 23 side.

Consequently, the air taken in from the air intake port 15 of the compressor 11 is compressed into high-temperature, high-pressure air by passing through the plurality of stator blades 17 and rotor blades 18, and, at the combustor 12, a predetermined amount of fuel supplied to this compressed air is combusted. Subsequently, the high-temperature, high-pressure combustion gas generated at this combustor 12 rotationally drives the rotor 25 by passing through the plurality of stator blades 21 and rotor blades 22, which constitute the turbine 13, and generates power by applying a rotational force to the generator 14 connected to this rotor 25, whereas exhaust gas is released to the atmosphere after being transformed at the exhaust diffuser 24 to have static pressure.

The gas turbine 10, which is configured such that the compressed air compressed by the compressor 11 is combusted in the combustor 12 by supplying fuel thereto and the generated combustion gas is supplied to the turbine 13 to acquire a rotational driving force, is provided with, as illustrated in FIG. 1 for example, a pressurizing device 40, which extracts, from a cylinder, and pressurizes part of the compressed air passed through the shutdown compressor 11 or compressed at the compressor 11.

As in FIG. 1, the compressed air compressed by the compressor 11 is supplied to the combustor 12 via a compressed-air supply channel 28 during startup while the load is being increased to achieve rated operation, during rated operation, and during shut-down while the load is decreased until shut-down, and the combustion gas generated at the combustor 12 is supplied to the turbine 13 via an exhaust channel 29 in a casing. Here, reference numeral 30 in the drawing represents a fuel supply channel.

The pressurizing device 40 is pressurizing means for pressurizing air used as a temperature-control medium (heating medium or cooling medium), which is described below, and, for example, is a compressor, blower, etc. Moreover, the pressurizing device 40 includes a dedicated motor 41 and is capable of operating independently from the compressor 11, which introduces air for carrying out pressurization. The pressurizing device 40 is desirably shared with, for example, a device (pressurizing device for boost-up used for closed cooling) that compresses and supplies air for cooling the combustor during rated operation and so on.

The intake side of the pressurizing device 40 is connected to a branching channel 42 branching from the compressed-air supply channel 28 formed in the cylinder, and the discharge side is connected to a temperature-control-medium supply channel 43. The temperature-control-medium supply channel 43 is a channel for guiding compressed air (pressurized temperature-control medium) to a turbine-cooling-medium channel 50 provided in stationary parts of the turbine 13.

For example, as illustrated in FIG. 3, the turbine-cooling-medium channel 50 is a channel connecting the turbine cylinder 20, the stator blades 21, and a blade ring 31, and is used for temperature control by cooling and heating by letting compressed air, flow through the blade ring 31, which is specifically disposed at positions opposing the tips of the rotor blades 22 and which is a stationary component affecting the tip clearance. The blade ring 31 is a member attached to the turbine cylinder 20 in such a manner that it surrounds the outer circumference of the rotor blades 22.

In other words, the turbine-cooling-medium channel 50 has a structure in which the blade ring 31 is cooled after cooling the stator blades 21 during rated operation etc. of the gas turbine 10 by letting compressed air having a relatively low temperature flow therethrough. Furthermore, this turbine-cooling-medium channel 50 has a structure in which the stator blades 21 and the blade ring 31 are heated and warmed up by letting compressed air having a relatively high temperature flow in preparation immediately before starting up the gas turbine 10, during startup, and during shutdown. Thus, this turbine-cooling-medium channel 50 can be used for cooling and heating stationary components in the ACC system. Here, reference numeral 31a in the drawing represents a blade-ring channel provided along the entire circumference of the blade ring 31.

The compressed air that passes through the turbine-cooling-medium channel 50 converges with the flow of the compressed-air supply channel 28 via a temperature-control-medium return channel 44 and then flows into the combustor 12 via the compressed-air supply channel 28.

Therefore, the pressurizing device 40 is operated during shutdown of the gas turbine to carry out ventilation cooling by exhausting the high-temperature gas remaining inside the turbine 13. A ventilation cooling system that carries out cooling by ventilating the high-temperature gas inside the turbine 13 during shutdown of the gas turbine 10 will be described below.

Since the compressor 11 connected to the turbine 13 is also in a shut-down state during shutdown of the gas turbine 10, when the pressurizing device 40 capable of operating independently from the compressor 11 is started up, the air taken in from the branching channel 42 is pressurized into compressed air, which flows out to the temperature-control-medium supply channel 43.

This compressed air flows into the compressed-air supply channel 28 via the temperature-control-medium supply channel 43, the turbine-cooling-medium channel 50, and the temperature-control-medium return channel 44. The compressed air flown into the compressed-air supply channel 28 flows to the combustor 12 side.

The compressed air flown to the combustor 12 side passes through the combustor 12 and the turbine 13 and is discharged to the atmosphere. At this time, the high-temperature gas remaining in the combustor 12 and the turbine 13 is discharged to the atmosphere by being pushed out by the compressed air.

Accordingly, by operating the pressurizing device 40 during shutdown of the gas turbine 10, the compressed air pressurized at the pressurizing device 40 forcefully discharges the high-temperature gas remaining in the turbine to the atmosphere, forming a ventilation cooling system that carries out quick ventilation cooling. That is, the compressed air flowing through the ventilation cooling system flows through the temperature-control-medium supply channel 43, the turbine-cooling-medium channel 50, and the temperature-control-medium return channel 44 from the pressurizing device 40, and then passes through the combustor 12 and the turbine 13 from the compressed-air supply channel 28 to be discharged to the atmosphere, thereby ventilating the high-temperature gas remaining in the combustor 12 and the turbine 13 to carry out cooling thereof.

In the gas turbine 10 according to this embodiment, cat back is prevented during shutdown of the gas turbine 10 by carrying out ventilation cooling inside the gas turbine in accordance with an operating method described below.

That is, the method includes a step in which the pressurizing device 40, which is connected to the branching channel 42 branching from the compressed-air supply channel 28 of the compressor 11 and which can operate independently from the compressor 11, introduces air and carries out pressurization thereof to carry out quick ventilation cooling by forcefully discharging the high-temperature gas remaining in the turbine 13 during shutdown of the gas turbine 10; a step in which the compressed air pressurized at the pressurizing device returns to the compressed-air supply channel 28 via the temperature-control-medium supply channel 43, the turbine-cooling-medium channel 50, and the temperature-control-medium return channel 44; and a step in which the compressed air is exhausted to the atmosphere from the compressed-air supply channel 28 via the combustor 12 and the turbine 13.

Figure 18:
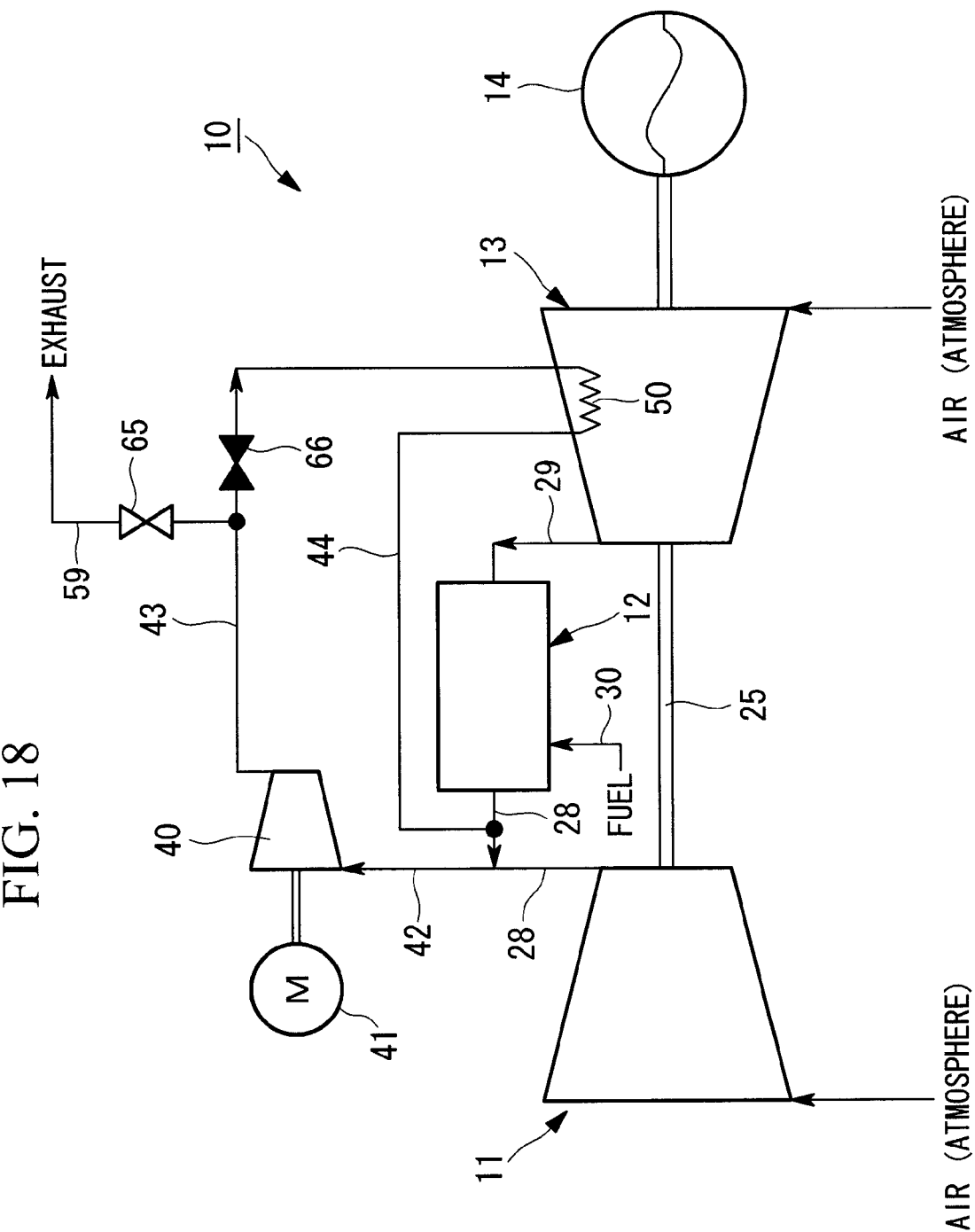
FIG. 18 is a schematic diagram illustrating a first modification according to the tenth embodiment illustrated in FIG. 1.
Figure 19:
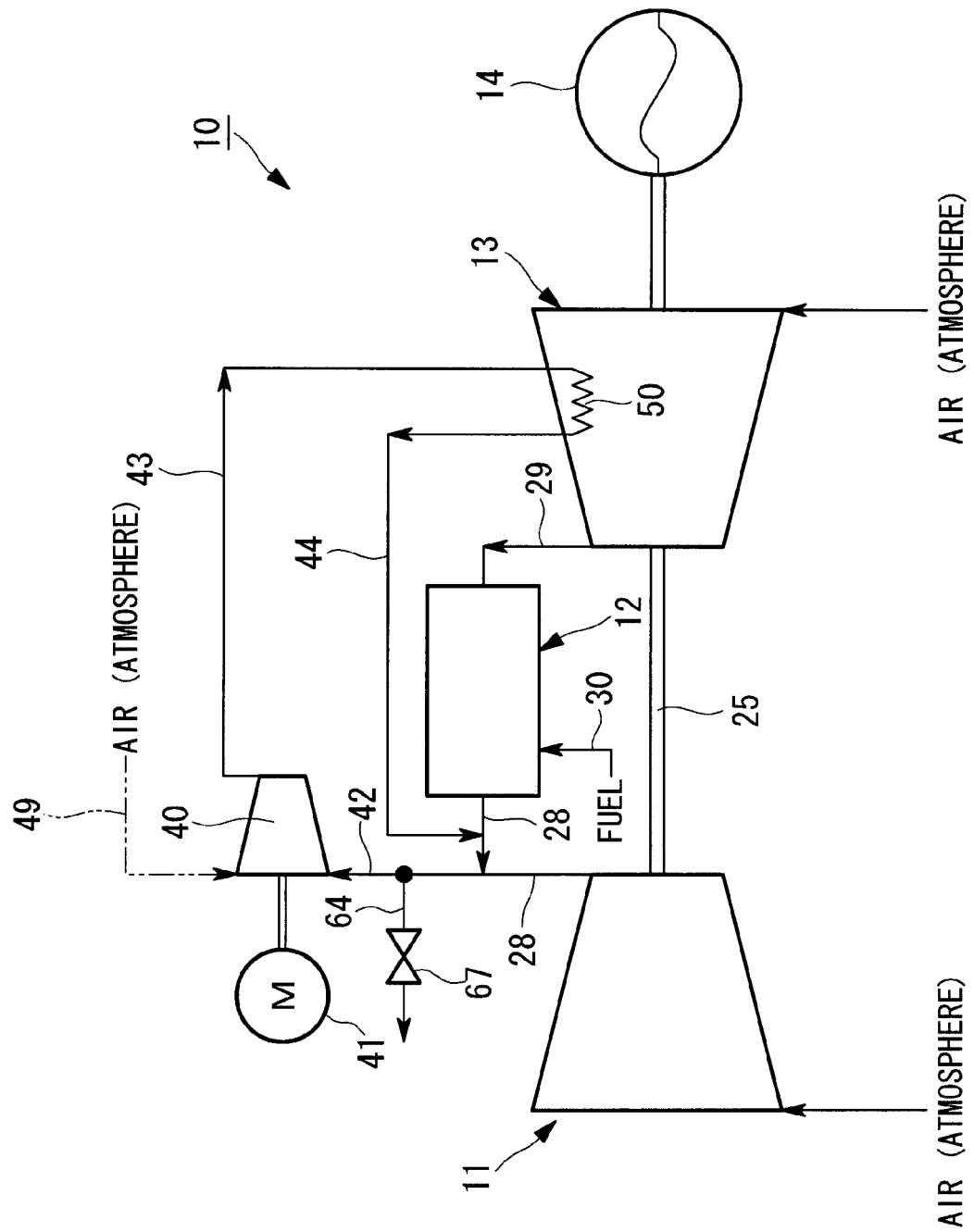
FIG. 19 is a schematic diagram illustrating a second modification according to the tenth embodiment illustrated in FIG. 1.

Furthermore, modifications such as those illustrated in FIGS. 18 and 19 may be employed as the above-described ventilation cooling system.

A ventilation cooling system according a first modification illustrated in FIG. 18 includes an exhaust channel 59 branching from the temperature-control-medium supply channel 43 and having a first open/close valve 65, which is channel opening/closing means, and a second open/close valve 66, which is provided as channel opening/closing means in the temperature-control-medium supply channel 43 at a position downstream of the branching point of the exhaust channel 59.

In the ventilation cooling system having such a configuration, the first open/close valve 65 is opened and the second open/close valve 66 is closed while starting up the pressurizing device 40 during shutdown of the gas turbine 10. However, during times other than shutdown of the gas turbine 10, the first open/close valve 65 is closed and the second open/close valve 66 is opened.

When the pressurizing device 40 is operated during shutdown of the gas turbine 10 in the above-described state, the compressed air pressurized at the pressurizing device 40 is discharged from the exhaust channel 59 to the atmosphere. At this time, since the intake side of the pressurizing device 40 has a negative pressure so that the high-temperature gas remaining in the turbine 13 is forcefully sucked and discharged to the atmosphere, ventilation cooling can be quickly carried out. That is, in the ventilation cooling system in this case, the high-temperature gas flows, from the inside of the high-temperature turbine 13, back to the branching channel 42 via the exhaust channel 29, the combustor 12 and the compressed-air supply channel 28, to be pressurized at the pressurizing device 40, and is then discharged to the atmosphere from the temperature-control-medium supply channel 43 via the exhaust channel 59 with the first open/close valve 65 opened.

A ventilation cooling system according to a second modification illustrated in FIG. 19 includes an exhaust channel 64 that branches from the branching channel 42 and is provided with a third open/close valve 67, which is channel opening/closing means.

In the ventilation cooling system having such a configuration, the third open/close valve 67 is opened while starting up the pressurizing device 40 during shutdown of the gas turbine 10. However, during times other than shutdown of the gas turbine 10, the third open/close valve 67 is closed.

When the pressurizing device 40 is operated during shutdown of the gas turbine 10 in the above-described state, the compressed air pressurized at the pressurizing device 40 passes through the inside of the turbine 13, and, in addition, high-temperature gas is taken into the intake side of the pressurizing device 40. Accordingly, the high-temperature gas present in the turbine 13 is forcefully pushed out and sucked in by the compressed air and is discharged from the exhaust channel 64 to the atmosphere; therefore, ventilation cooling can be quickly carried out. At this time, the intake side of the pressurizing device 40 may have a negative pressure so that the high-temperature gas remaining in the turbine 13 is forcefully pushed out and taken in, or the high-temperature gas remaining in the turbine 13 may be forcefully pushed out by providing an intake system 49 in which the pressurizing device 40 directly takes in air from the atmosphere.

In this way, when ventilation cooling is quickly carried out by discharging the high-temperature gas in the turbine 13 to the atmosphere after the gas turbine 10 is shut down, cat back can be prevented since the temperature difference inside the turbine can be alleviated or eliminated.

Furthermore, with regard to additional equipment required for the above-described cat back prevention, the effective use of the pressuring means 40 and so on by sharing them as pressurizing means for boost-up used for closed cooling enables cat back prevention without adding new equipment.

Eleventh Embodiment

Figure 20:
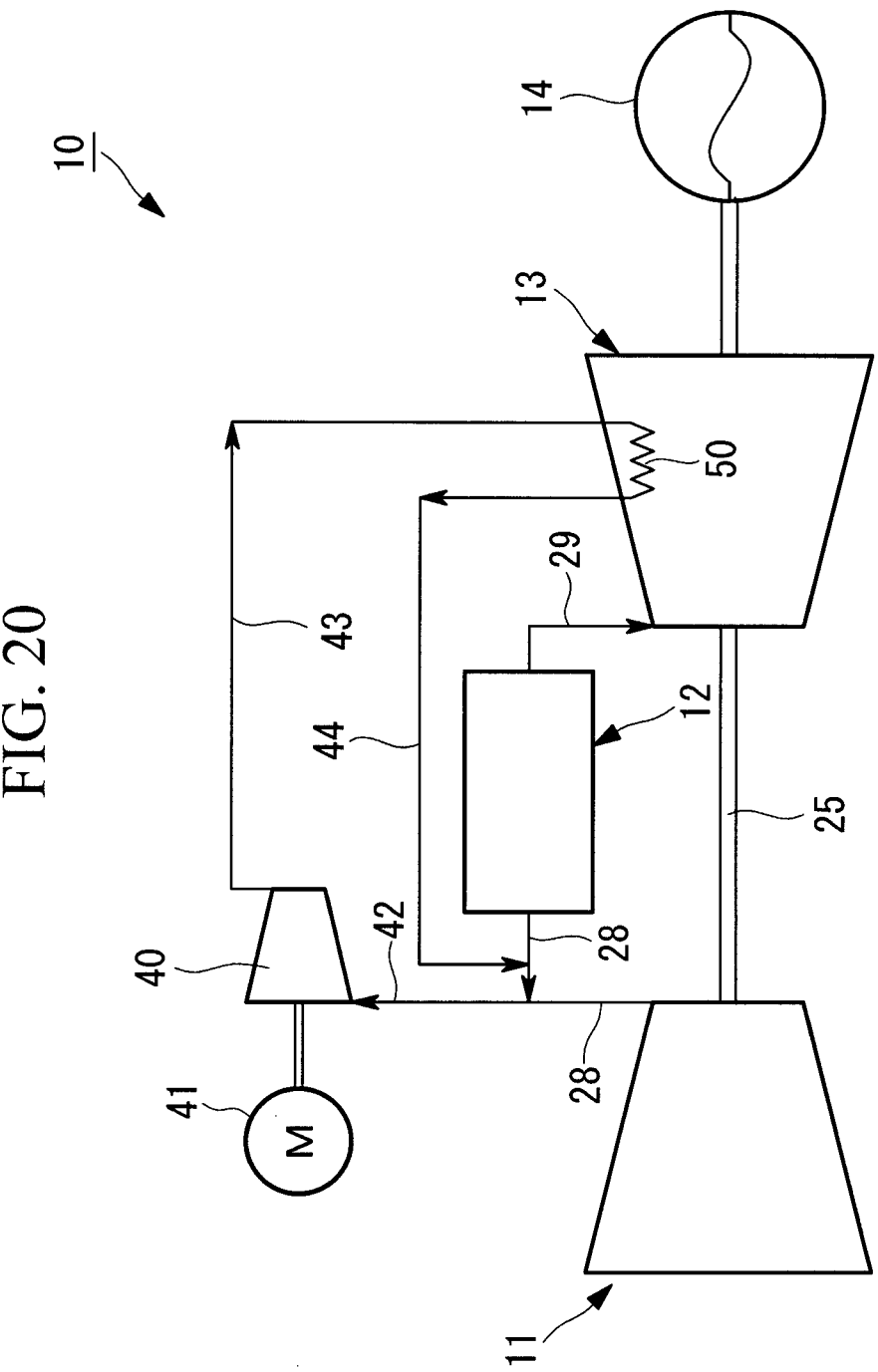
FIG. 20 is a schematic diagram illustrating a gas turbine according to an eleventh embodiment of the present invention.

Next, a gas turbine according to an eleventh embodiment will be described on the basis of FIG. 20. Here, parts that are the same as those according to the above-described embodiments will be represented by the same reference numerals, and detailed descriptions thereof will be omitted.

The gas turbine 10 according to this embodiment operates the pressurizing device 40 during shutdown of the gas turbine 10 and lets compressed air (pressurized temperature-control medium) flow in the turbine-cooling-medium channel 50. That is, unlike the tenth embodiment in which ventilation cooling of the inside of the turbine 13 is actively carried out, compressed air (including high-temperature gas) flows through the turbine-cooling-medium channel 50 in a circulating manner by, for example, closing the air intake port 15 of the compressor 11 and the exhaust side of the turbine 13, when required, to make the temperature distribution uniform.

That is, high-temperature gas (temperature-control medium) present inside the combustor 12 and the turbine 13 is taken in for pressurization by operating the pressurizing device 40 and is transformed into compressed air that functions as a pressurized temperature-control medium. After this compressed air flows out to the temperature-control-medium supply channel 43, it is taken into the pressurizing device 40 via the turbine-cooling-medium channel 50, the temperature-control-medium return channel 44, the compressed-air supply channel 28, and the branching channel 42. As a result, the compressed air circulates in a closed-circuit channel.

Since compressed air that circulates in this way flows through the blade-ring channel 31a, which is formed in the blade ring 31, when passing through the turbine-cooling-medium channel 50, the temperature distribution around the turbine cylinder 20 is made substantially uniform along the entire circumference thereof. Thus, since a temperature difference due to convection is less likely to occur inside the turbine 13 and the entire temperature distribution is made substantially uniform, cat back can be prevented.

Furthermore, when compressed air pressurized at the pressurizing device 40 is circulated, although the temperature is lowered by heat radiated from the turbine cylinder 20, the internal temperature of the turbine 13 can be maintained at a relatively high temperature by circulating the compressed air having a high temperature due to pressurization. As a result, for example, with the gas turbine 10 operated in the DSS mode, a temperature drop that occurs during the period from shutdown to restarting operation can be minimized, and, thus, the time required for a warm-up operation, which is required at restart, can be reduced.

In the gas turbine 10 according to this embodiment, cat back is prevented during shutdown of the gas turbine 10 by carrying out ventilation cooling inside the gas turbine in accordance with an operating method described below.

That is, the operating method for when the gas turbine is shut down includes a step in which the pressurizing device 40, which is connected to the branching channel 42 branching from the compressed-air supply channel 28 of the compressor 11 and which can operate independent from the compressor 11, introduces air and carries out pressurization thereof; a step in which the compressed air pressurized at the pressurizing device 40 returns to the compressed-air supply channel 28 via the temperature-control-medium supply channel 43, the turbine-cooling-medium channel 50, and the temperature-control-medium return channel 44; and a step in which the compressed air is taken into the pressurizing device 40 from the compressed-air supply channel 28 via the branching channel 42.

Therefore, during shutdown of the gas turbine 10, since compressed air flows through the turbine-cooling-medium channel 50 in a circulating manner, and this flow extends over the entire circumference of the turbine cylinder 20, the temperature distribution of the inside of the gas turbine 10 is made substantially uniform.

Moreover, it is desirable that the operating method during shutdown described above in the tenth embodiment in which ventilation cooling is carried out or the operating method during shutdown described in this embodiment in which the temperature distribution is made uniform by compressed air circulation be selectively used in consideration of the shutdown period of the gas turbine 10.

Specifically, when the shutdown period of the gas turbine is long, the shutdown operating method in which ventilation cooling is carried out should be selected, whereas, when the shutdown period of the gas turbine is short, the shutdown operating method using compressed air circulation should be selected.

By carrying out such selection, the warm-up operation period required at restart can be shortened because, when the gas turbine shutdown period is short, such as in the DSS mode, and the gas turbine is restarted after a short shutdown, lowering of the temperature during the period from shutdown to restarting operation can be minimized. That is, cat back prevention, as well as smooth and efficient DSS operation, can be carried out.

In this way, according to the above-described present invention, the operation required for cat back prevention can be reliably and quickly carried out by discharging the high-temperature gas in the turbine 13 to the atmosphere or by maintaining the temperature distribution in the turbine 13 in a substantially uniform state. In particular, when the compressed air flows in the turbine-cooling-medium channel 50 so as to circulate therein and the temperature distribution in the turbine 13 is maintained in a substantially uniform state, even when operation and shutdown of the gas turbine are carried out frequently, such as in the DSS mode, the operation required for cat back prevention can be completed quickly, and the warm-up operation period at startup can be shortened.

Furthermore, with regard to additional equipment required for cat back prevention, the effective use of the pressurizing means 40 and so on by sharing them as pressurizing means for boost-up used for closed cooling enables stable operation shutdown of the gas turbine 10 by performing ACC control enabling cat back prevention with minimum additional equipment, i.e., without adding new equipment.

The present invention is not limited to the embodiments described above; for example, the connection configuration etc., of the compressor and the turbine may be appropriately modified without departing from the scope of the invention.

REFERENCE SIGNS LIST 10 gas turbine
11 compressor
12 combustor
13 turbine
20 turbine cylinder
21 stator blade
22 rotor blade
28 compressed-air supply channel
29 exhaust channel
31 blade ring
40 pressurizing device
42 branching channel
43 temperature-control-medium (heating medium or cooling medium) supply channel
44 temperature-control-medium (heating medium or cooling medium) return channel
45 bypass channel
47 heating-medium branching supply channel
48 heating-medium branching return channel
50 turbine-cooling-medium channel
51 compressed-air cooling-medium channel
60, 62, 90 heat exchanger
59, 64 exhaust channel
70 atmosphere-intake channel
71 heating-medium receiving channel
80 combustor cooling channel
75 coolant supply channel

The invention claimed is:

1. A startup operating method for a gas turbine that supplies combustion gas generated by supplying fuel to a combustor where the fuel is combusted with compressed air compressed at a compressor to a turbine to acquire rotational power and that has an active clearance control ACC system, the method, which is carried out at startup of the gas turbine and in preparation immediately before startup, comprising:
 a step in which pressurizing means, which is connected to a branching channel branching from a discharge-side channel of the compressor and capable of operating independently from the compressor, introduces and pressurizes a temperature-control medium;
 a step in which the pressurized temperature-control medium pressurized at the pressurizing means is supplied to a turbine-cooling-medium channel provided in a stationary component of the turbine to raise the temperature of the stationary component with the pressurized temperature-control medium passing through the turbine-cooling-medium channel; and
 a step in which the pressurized temperature-control medium is guided from the turbine-cooling-medium channel to the discharge-side channel such that the flows are combined.

2. The startup operating method for a gas turbine according to claim 1, wherein the pressurized temperature-control medium is guided to a blade ring of the turbine.

* * * * *